United States Patent [19]

Hozumi et al.

[11] 4,249,062
[45] Feb. 3, 1981

[54] APPARATUS AND METHOD FOR SENSING WELDING POINT IN AUTOMATIC WELDING APPARATUS

[75] Inventors: Keiichi Hozumi, Kobe; Yuji Nishikaichi, Nishinomiya; Masao Ueda, Nishinomiya; Tatsuya Miura, Nishinomiya; Hirotoshi Yamamoto, Akashi, all of Japan

[73] Assignee: Shin Meiwa Industry Co., Ltd., Hyogo, Japan

[21] Appl. No.: 927,950

[22] Filed: Jul. 25, 1978

[30] Foreign Application Priority Data

| Mar. 9, 1978 | [JP] | Japan | 53-27288 |
| Jun. 13, 1978 | [JP] | Japan | 53-71833 |
| Jun. 15, 1978 | [JP] | Japan | 53-73004 |
| Jun. 15, 1978 | [JP] | Japan | 53-73005 |
| Jun. 15, 1978 | [JP] | Japan | 53-73006 |
| Jun. 15, 1978 | [JP] | Japan | 53-73007 |

[51] Int. Cl.³ ............................................. B23K 9/12
[52] U.S. Cl. ........................... 219/124.34; 219/124.22; 219/137.71; 219/137.8; 318/576
[58] Field of Search .............. 219/124.22, 124.34, 219/125.1, 137.71, 137.8, 125.12; 318/576

[56] References Cited

U.S. PATENT DOCUMENTS

| 3,567,900 | 3/1971 | Nelson et al. | 219/137.8 |
| 3,934,110 | 1/1976 | Denis | 219/137.71 |
| 4,151,395 | 4/1979 | Kushner et al. | 219/124.34 |

FOREIGN PATENT DOCUMENTS

| 2442725 | 11/1975 | Fed. Rep. of Germany | 219/125.1 |
| 2631250 | 2/1977 | Fed. Rep. of Germany | 219/124.22 |

*Primary Examiner*—C. C. Shaw
*Attorney, Agent, or Firm*—Staas & Halsey

[57] ABSTRACT

An automatic welding apparatus comprises a welding torch including an electrode and a fixture for fixing a workpiece, and a relative positional relation of the welding torch and the workpiece fixture is controlled such that the electrode of the welding torch is moved to trace the welding line of the workpiece, whereby automatic welding is achieved. The automatic welding apparatus further comprises a switch for selectively connecting the electrode of the welding torch to a welding power supply or a detecting power supply, and a sensor for sensing a current or a voltage between the electrode and the workpiece when the electrode is switched to the detecting power supply, whereby the relative positional relation between the welding torch and the workpiece is detected in response to the output of the sensor, and thus a welding point or a welding line is sensed. In the case where the automatic welding apparatus is a wire extension type, adapted to successively feed the electrode in accordance with the progress of welding, a collet chuck for clamping the electrode to the welding torch is provided for fixing the length of the electrode from the welding torch on the occasion of the sensing mode.

81 Claims, 20 Drawing Figures

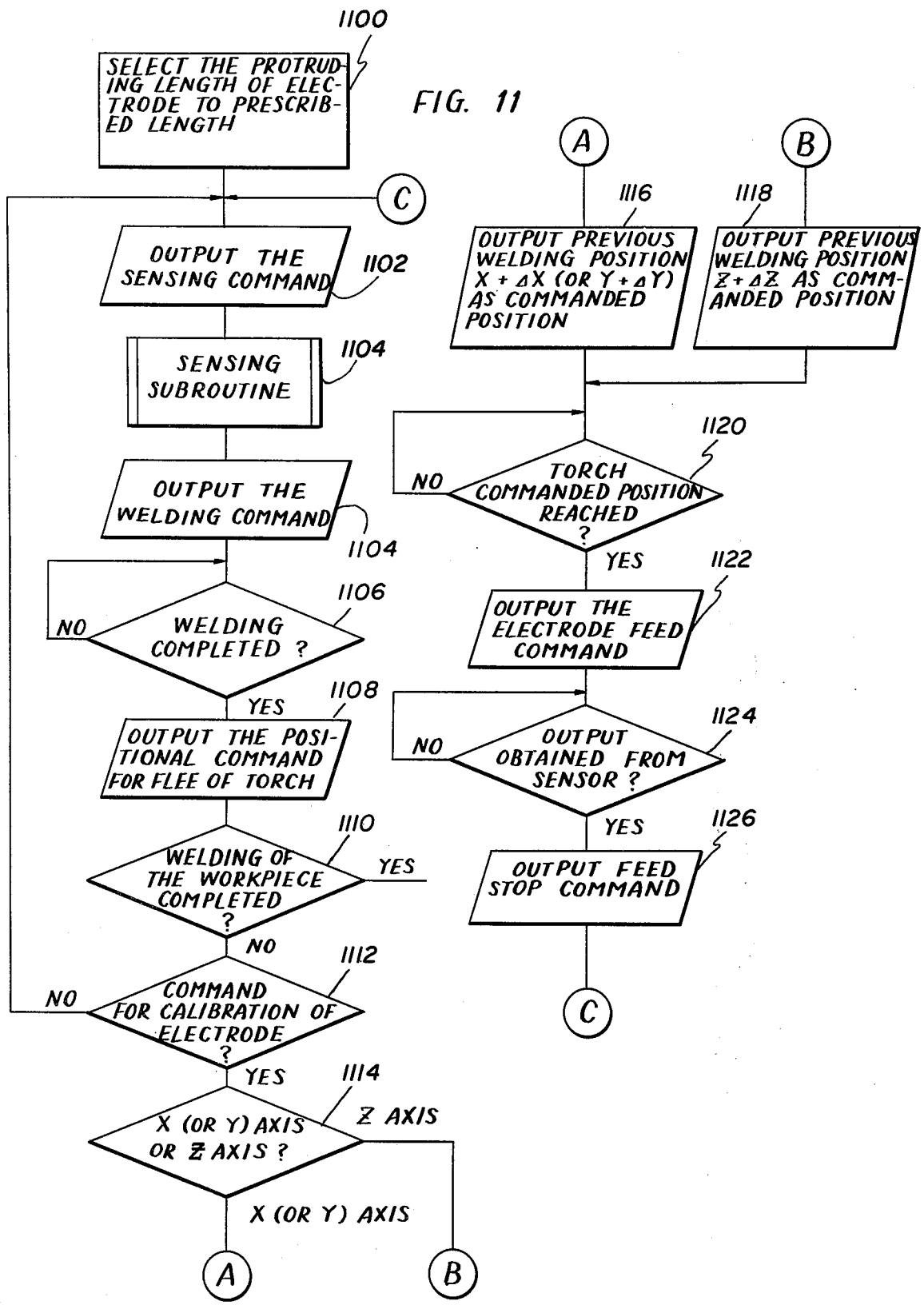

APPARATUS AND METHOD FOR SENSING WELDING POINT IN AUTOMATIC WELDING APPARATUS

BACKGROUND OF THE INVENTION

1. Field of the Invention

The present invention relates to an automatic welding apparatus. More specifically, the present invention relates to a novel automatic welding apparatus, wherein a welding torch itself is used for sensing a welding line of a workpiece in an arc welding process.

2. Description of the Prior Art

An automatic welding apparatus of the play back type has been proposed and put into practical use, wherein a relative positional relation in the space between a welding torch and a workpiece is controlled in accordance with positional information and control information stored in a storage or a control apparatus, thereby to achieve an automatic welding process in accordance with a program. It has also been known to those skilled in the art that a sensor can be employed to make a welding torch trace a welding line of a workpiece. A conventional sensor for detecting a welding line of the workpiece was provided separately from the welding torch, but in the vicinity of the welding torch. As a result, the whole geometry of the welding torch was large. Therefore, it could happen that the welding torch, and thus the sensor do not reach the innermost recess of the workpiece, or the sensor does not effectively act on the welding line when the geometry of beveling or the angle of beveling is small. In addition, such a conventional apparatus is complicated in structure and expensive in cost, leaving various problems to be solved.

SUMMARY OF THE INVENTION

Briefly described, according to the present invention, a relative positional relation of a welding torch and a workpiece is controlled by means of a control means comprising a data processing unit. In a sensing mode, an electrode of the welding torch is supplied with a detecting high voltage. In the sensing mode, a conduction state between the electrode of the welding torch and the workpiece is detected and the control apparatus receives an output indicating the conduction state, whereupon a mutual positional relation is effected.

In a peferred embodiment, the electrode length from the welding torch is kept constant and, to that end, a scheme for maintaining such a state is additionally provided.

According to the present invention, using the electrode of the welding torch per se as a sensor makes it possible to dispense with a structural member such as a sensor around the torch, and also make it possible to detect any position of the welding line where the torch can enter. The above described feature makes the inventive apparatus simple in structure and further makes it possible to detect the position of the welding line of any geometry.

The present invention can be applied even to a case where a consumptive electrode is employed, by providing a shaping or forcing apparatus, such that the tip end of the electrode is always brought to a predetermined position with respect to the welding torch, whereby any problem in the sensing mode is eliminated. In a preferred embodiment, the detecting voltage source is of a high voltage. In such case, the discharge spacing remains approximately constant irrespective of the conditions of the surface of the workpiece or the tip end of the electrode, which makes an accurate sensing operation consistently possible.

In another preferred embodiment of the present invention, even the sensing operation of the welding line is adapted to be achieved in accordance with a teaching operation. Therefore, even if the workpiece or base metal is changed, the initiating point and the terminating point of the welding are automatically sensed and taught. Therefore, the conventional manual control technique for determining mutual positional relation between the workpiece and the welding torch in the play back operation can be dispensed with, and this shortens the time required for a teaching operation and makes possible an accurate teaching operation.

Therefore, a principal object of the present invention is to provide a novel automatic welding apparatus, wherein a welding torch itself is also used as a sensor.

Another object of the present invention is to provide an automatic welding apparatus, wherein a welding torch is used as a sensor and a stabilized sensing operation is achieved.

A further object of the present invention is to provide an automatic welding apparatus, which is simple in structure.

Still a further object of the present invention is to provide an automatic welding apparatus, which is capable of detecting a beveling with ease and within a short period of time.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flow diagram showing an operation of another embodiment of the present invention in an automatic welding mode;

DESCRIPTION OF THE PREFERRED EMBODIMENTS

Figure 1:
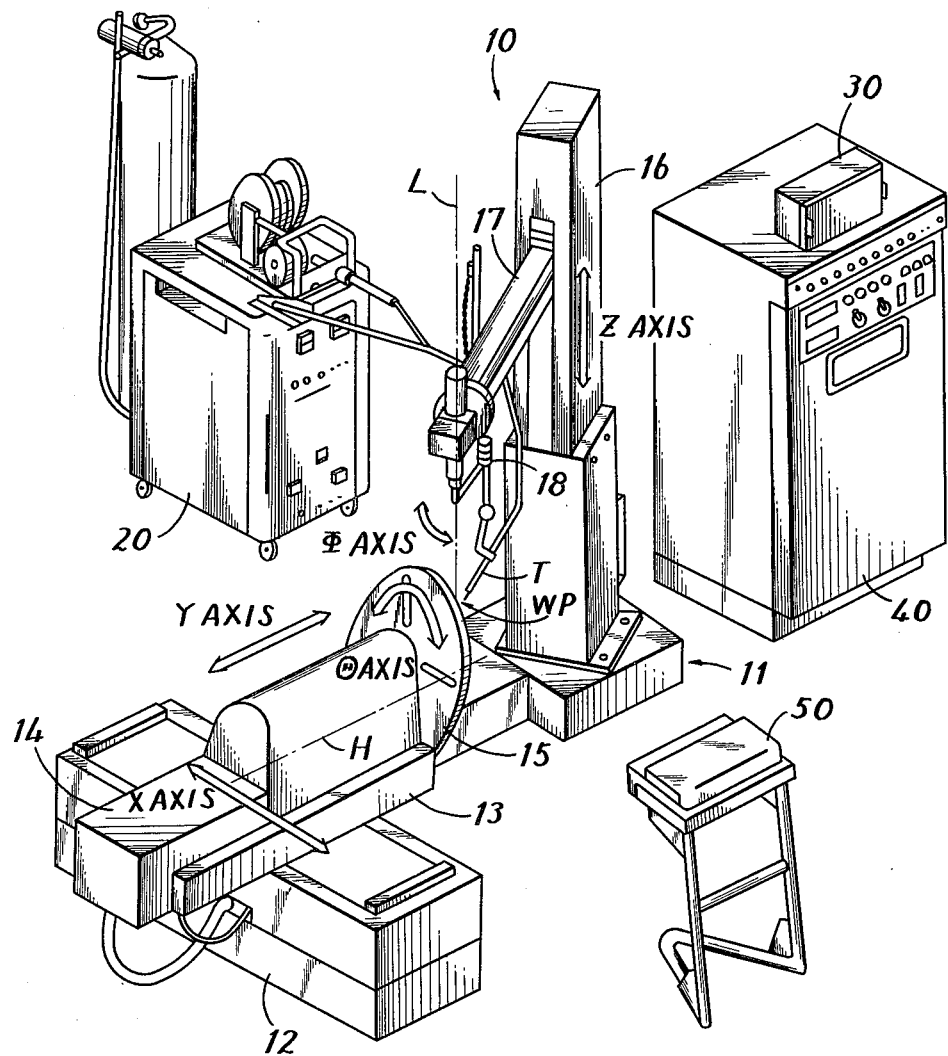
FIG. 1 is a perspective view of one example of an automatic welding apparatus, wherein the present invention can be advantageously employed.

FIG. 1 is a complete perspective view showing an automatic welding apparatus which forms the background of the present invention and wherein the present invention can be advantageously employed. The automatic welding apparatus shown is arranged such that the necessary degrees of freedom are divided between a workpiece fixture and a welding torch fixture, so that the position of a workpiece or the welding torch can be controlled. Therefore, even in case of three-dimensionally welding a workpiece of complicated shape, welding can be performed with an optimum attitude of the workpiece, which provides convenient welding conditions, and the mechanical structure and the control apparatus are also simple.

Referring to FIG. 1, the automatic welding apparatus 10 shown is arranged such that a fixture 15 for fixing a workpiece (not shown) can be moved right and left and back and forth and rotated by an amount $\theta$ of rotation around a horizontal axis H (simply referred to as $\theta$ axis) and a fixture 18 for fixing a welding torch T can be vertically moved and rotated by an amount $\phi$ of rotation around a vertical axis L (simply referred to as $\phi$ axis), there being provided a control box 40 for automatically controlling the movement and rotative position of the workpiece (not shown) and the torch T.

A base plate 11 which is L-shaped in plan view has a first frame body 12 fixed to one side thereof. Mounted on top of the frame body 12 is a carriage 13 movable right and left or in the direction of the X-axis shown in the figure. A prime mover, not shown, for the carriage 13 may be a well known motor equipped with a reduction gear mechanism and a brake, while a power transmission means, not shown, for the carriage may be a ball-and-nut engagement means, which is often called a ball screw. Further, a second frame body 14 is mounted on the top of the carriage 13 so as to be movable back and forth in the direction of the Y-axis shown in the figure. A prime mover and power transmission means for the frame body 14, not shown, may be a similar motor equipped with a reduction gear mechanism and a brake and a ball screw. The workpiece fixture 15 is provided on the front of the frame body 14 so as to be rotatable in the $\theta$-axis direction shown in the figure. A prime mover for the workpiece fixture 15, not shown, may also be a known motor equipped with a reduction gear mechanism and a brake.

A third frame body 16 is erected on the other side end of the base plate 11. The third frame body 16 is provided with an arm 17 movable in the vertical direction, i.e. the Z-axis direction shown in the figure. A prime mover and power transmission means for the arm 17, not shown, may also be a similar motor equipped with a reduction gear mechanism and a brake, and a ball screw, respectively. The arm 17 is provided at its front end with the fixture 18 for fixing the welding torch T. A prime mover for the welding torch fixture 18, not shown, may also be a known motor equipped with a reduction gear mechanism and a brake. Further, the position where the welding torch T is fixed is selected such that the welding point WP on an extension of the center line of the welding torch T is aligned with the vertical axis L, while the fixing angle thereof is suitably selected according to the manner of the welding to be performed, such as butt welding or fillet welding, and according to the shape of the workpiece as well. Further, the welding torch T is supplied with a current from a welding power source 20.

The forward and backward translation and rotation, the rate of movement of the prime movers (such as motors each equipped with a reduction gear mechanism and a brake for the individual parts) and the welding current are automatically controlled by means of the control box 40 and the welding control device 30 in accordance with a program stored in the control box 40, and the relative position between the two fixtures 15 and 18 is controlled such that the welding point WP may trace a welding line on a workpiece, not shown, and thus an automatic welding operation can be performed in an attitude which provides optimum welding conditions. A remote control panel 50 is provided for manual operation and for preloading a program for that purpose.

In addition, in the example shown, since the welding point WP on an extension of the center line of a welding torch T is adapted to be aligned with the vertical axis L, the welding point remains unchanged irrespective of the rotation of the fixture 18 in the $\phi$-axis direction, and the attitude of the welding torch T with respect to the welding point can be optionally changed by the rotation of the fixture 18 in the $\phi$-axis direction. In other words, the automatic welding apparatus of the example shown has five degrees of freedom, i.e. the amounts X, Y and Z of displacement along the X, Y and Z axes, respectively, and the amounts $\phi$ $\theta$ of rotation about the L and H axes, respectively.

Although not shown, the welding control device 30 is provided with a voltage regulator and a current regulator, each comprising a variable resistor and the like, as is well known in the art. Further, in order to provide for changeover between a welding machine proper mode and a welding robot mode, there is provided a robot changeover switch. This switch is normally set for the welding robot mode and operatively associated with the workpiece.

Position control of this type of automatic welding apparatus is described in more detail in the copending United States patent application, Ser. No. 815,783, entitled "Method and System of Velocity Control for Automatic Welding Apparatus", filed July 14, 1977 by Shigeo Maruyama et al and assigned to the same assignee as the present application. Briefly described, a relative positional relation of a welding torch and a workpiece fixture is controlled based on positional information concerning the present positions of the welding torch and the workpiece fixture and command positional information concerning a desired positional relation of the welding torch and the workpiece fixture as programmed in advance to reach the commanded relative positional relation of the welding torch and the workpiece, whereupon next command positional information is obtained and the next commanded relative positional relation is reached. The above referenced patent application issued on Dec. 18, 1979 as U.S. Pat. No. 4,179,602 and is incorporated herein by reference thereto.

It is pointed out that the above described type of automatic welding apparatus should not be construed by way of limitation but the present invention can be employed in any other well known type of automatic welding apparatus.

Figure 2:
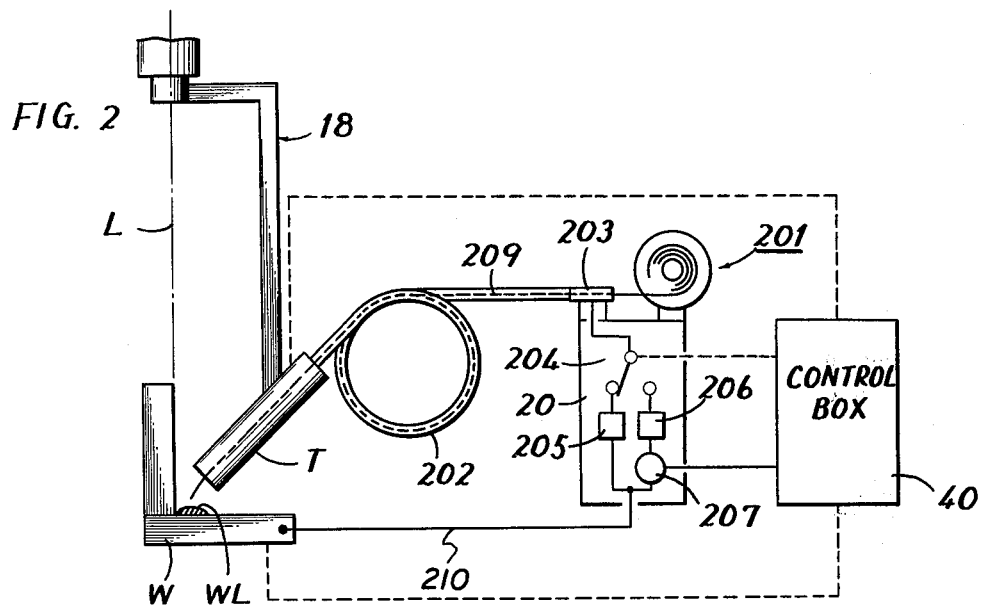
FIG. 2 is a schematic view of a consumptive electrode supply and a power supply.

FIG. 2 shows a schematic view of a consumptive electrode supply. The torch T is mounted rotatably about the axis L by means of the torch fixture 18, as described previously. The torch T is supplied with a consumptive electrode 209 from a consumptive electrode supply means 201. The consumptive electrode supply means 201 is provided in the power supply apparatus 20 as shown in FIG. 1, and comprises a consumptive electrode shaping apparatus 202. The consumptive electrode shaping apparatus 202 will comprise a loop like arrangement of a flexible tube for allowing passage of the consumptive electrode therethrough, such that the consumptive electrode 209 as allowed to pass through the flexible tube is given a curl. Alternatively, the shaping apparatus 202 may be a straightening roller adapted for sandwiching the consumptive electrode so as to straighten the same. The consumptive electrode 209 as supplied from the consumptive electrode supply means 201 has applied thereto a voltage from a well known voltage applying means 203. The voltage applying means 203 is selectively connected by means of a switch 204 to a welding voltage source 205 or to a discharging high voltage source 206 serving as a detecting voltage source. The welding voltage source 205 is a well known voltage source for supplying a welding voltage and is adapted to provide an electric power of a relatively low voltage but of a large current. On the other hand, the discharging high voltage source 206 is adapted to provide an electric power of a relatively high voltage of about 100 to 2000 volts and of a small current. The welding voltage supply 205 is directly connected to a workpiece W (via line 210) and the discharging high voltage source 206 is connected to the workpiece W through an electric current sensor 207 and line 210. The electric current sensor 207 is structured to detect a current flowing between the consumptive electrode 209 of the torch T and the workpiece W. A voltage sensor for detecting a voltage may be substituted for the current sensor 207. The output signal associated with the current value variation from the current sensor 207, or associated with the voltage variation of such a voltage sensor, is applied to a control means of a general purpose computer, or to a microcomputer or a microprocessor, in the control box 40. The above described switch 204 is normally turned to the welding voltage source 205 as shown in FIG. 2 but is turned to the discharging high voltage source 206 responsive to a switch command from the control box 40.

Figure 3:
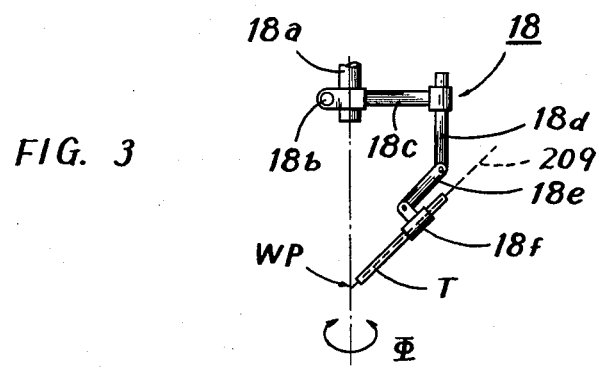
FIG. 3 is an enlarged view showing the detail of a torch fixture.

FIG. 3 is an enlarged side view of the torch fixture 18. As seen from FIG. 3, the torch fixture 18 comprises a horizontal directional arm 18c detachably provided to the lower portion of a shaft 18a by means of a bolt 18b, a vertical directional arm 18d fixedly provided to the tip end of the arm 18c, a rod 18e pivotally mounted to the lower end of the arm 18d, and a torch holding member 18f pivotally and detachably provided to the tip end of the rod 18e. Accordingly, the welding point WP of the torch T can be fine adjusted by pivoting the rod 18e and the holding member 18f.

Figure 4:
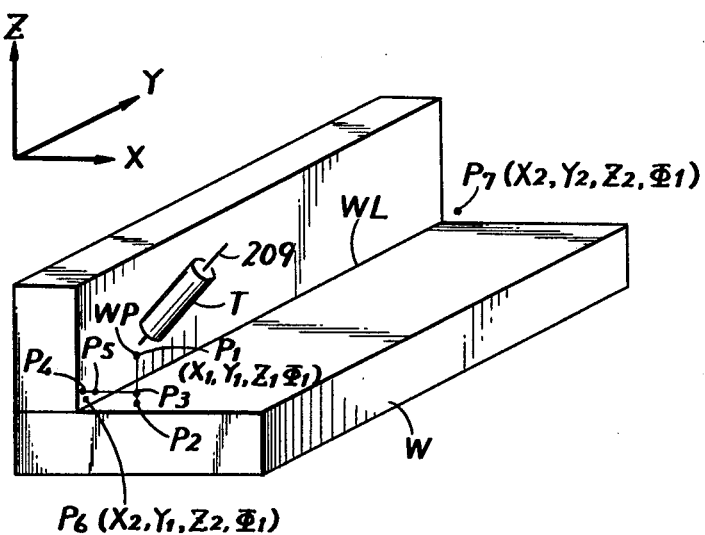
FIG. 4 is a perspective view of a portion of a workpiece, wherein the workpiece being welded is a fillet.
Figure 5:
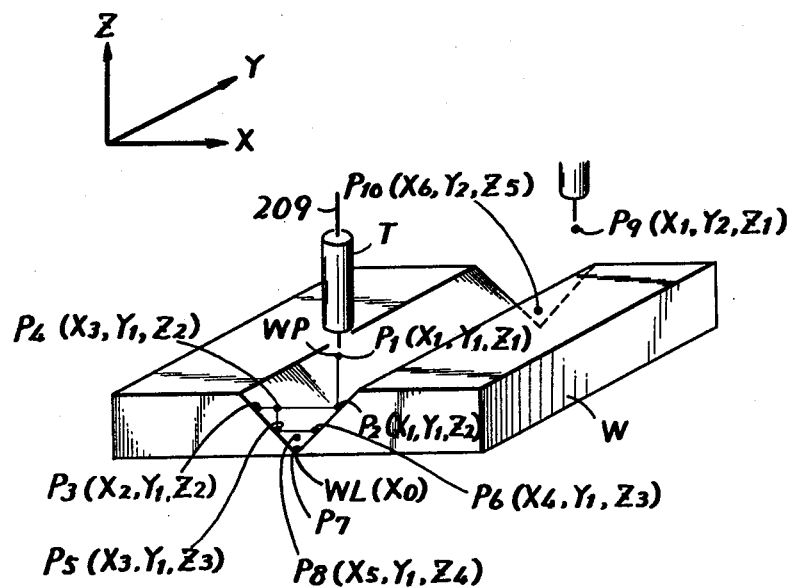
FIG. 5 is a perspective view of a workpiece, wherein the workpiece being welded is a beveling.

FIGS. 4 and 5 shows perspective views of workpieces W to which the present invention can be applied. More specifically, FIG. 4 shows a case of fillet, and FIG. 5 shows a case of butt welding with the resultant beveling.

Figure 6:
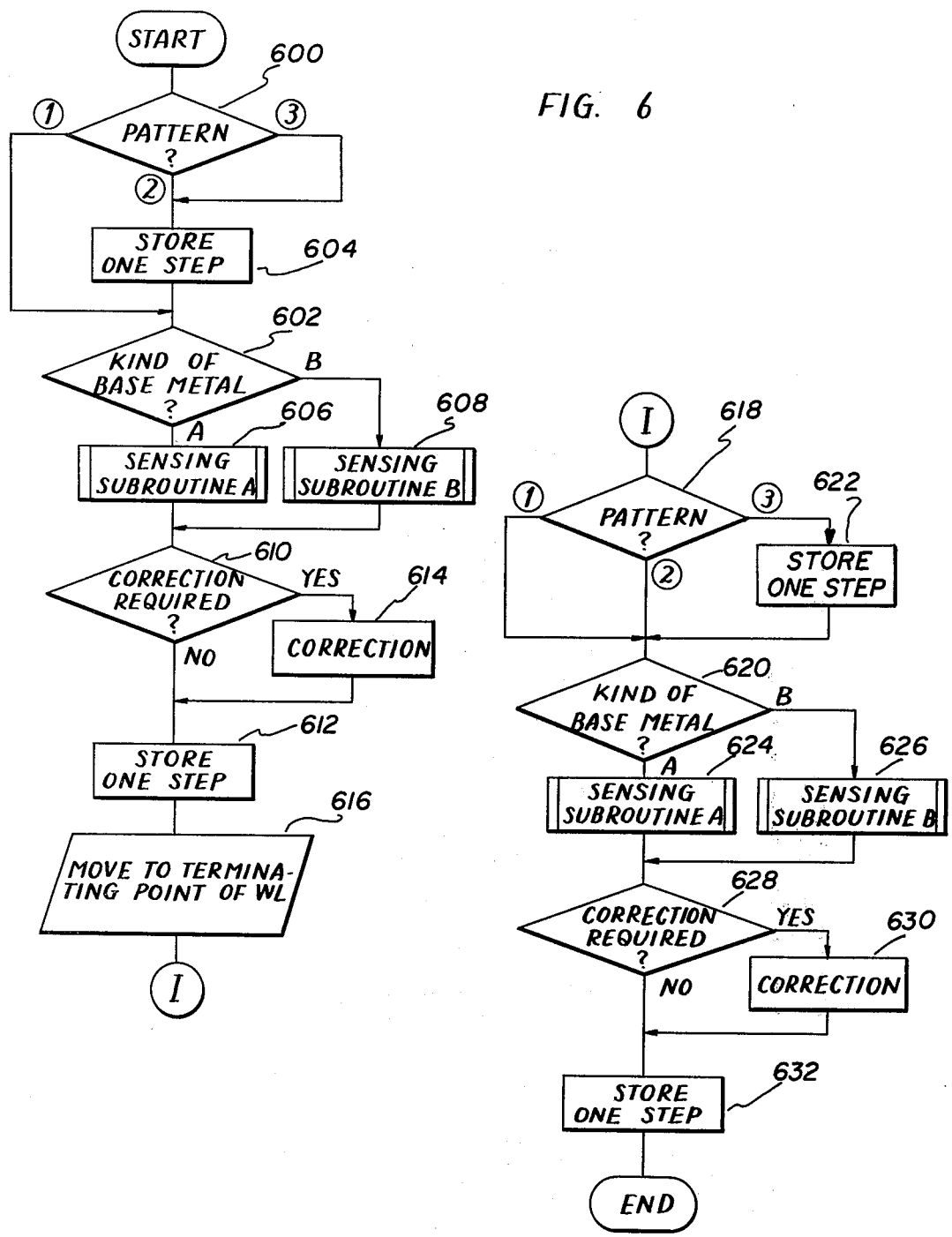
FIG. 6 is a flow diagram showing an operation of the present invention in a teaching mode.

FIG. 6 is a flow diagram showing one embodiment of the present invention in a teaching mode. The operation of the embodiment will be described in the following.

At the outset, a pattern of teaching will be described. Generally, workpieces being welded can be classified into several types or patterns depending on the precision, geometry and the like thereof. Therefore, in the teaching mode, the information concerning the pattern of the workpiece is manually entered. At the outset, the patterns of the workpieces to be entered in the teaching mode will be described.

Pattern 1:

This pattern covers workpieces or base metals of such high precision that the initiating point and the terminating point of welding are sensed only in the teaching mode, while the same positional information can be used when such workpieces are replaced.

Pattern 2:

This pattern covers workpieces of less precision as compared with the pattern 1, wherein, although the sensing operation must be taught, an error is caused only in the parallel direction, and therefore only the initiating point of welding must be sensed.

Pattern 3:

This pattern covers workpieces wherein, in addition to the case of pattern 2, the welding line deviates in a direction other than the parallel direction, which necessitates the sensing operation in the initiating point and the terminating point of the welding.

First, a data processing unit or a control means, not shown, in the control box 40 (FIG. 1) is placed in a teaching mode and, through manual operation of operating buttons, not shown, of the remote control panel 50, the welding torch T is controllably moved through manual operation to the vicinity of the position being sensed, in this case, the vicinity of the initiating point of welding, in accordance with a well known play back system. The data concerning which of the above described patterns 1 to 3 are to be implemented with respect to the workpiece being welded is entered by means of a pattern selection switch, not shown, provided in the control box 40. Further, the data concerning which kind of base metal A such as in the case of fillet welding as shown in FIG. 4, or B such as a case of butt welding as shown in FIG. 5 is to be used is entered by means of an input switch, not shown. A sensing command is then given.

Accordingly, the control means makes a decision as to which pattern 1, 2 or 3 is selected (FIG. 6—block 600). If the decision is pattern 1, then the control means makes decision as to which kind the base metal or workpiece belongs to, A or B (block 602). If the pattern is other than the pattern 1, i.e. the pattern is the pattern 2 or 3, then the data concerning the above described vicinity is stored as initial positional information (block 604) and the kind of the base metal is then decided (block 602). If the kind of the base metal is A, then the subroutine of the sensing A is initiated (block 606). If the kind of the base metal is B, then the subroutine of the sensing B is initiated (block 608).

Now referring to FIGS. 2, 4 and 7, a sensing operation in the case where the kind of base metal is A will be described. If the subroutine is initiated, a command to the switch 204 is outputted by a system program previously entered in the data processing unit (block 700), whereby the switch 204 is switched. Similarly, a command for lowering the Z axis, i.e. a command for lowering the torch T, is outputted by the system program (block 702), whereby the torch T is lowered. A high voltage is applied between the electrode of the torch T and the workpiece W from the voltage source 206. Therefore, when the tip end of the electrode of the torch T is brought to the point P2, where the distance between the workpiece and the tip end of the electrode is about 2 mm at the largest, a spark occurs therebetween. Thus, the electric current sensor 207 detects the current caused thereby, and the data Zs out of the positional information concerning the position P2 is loaded in response to the detected signal, whereupon the difference $\Delta Z$ between the above described data Zs and the data Z2 out of the command information in this step is evaluated by the control apparatus or the data processing unit (blocks 704 and 706). At the same time, the torch T is raised by a predetermined amount of say 1 mm to 2 mm by the system program, to the point P3 (block 708).

The control apparatus makes a decision as to the next sensing direction X and the sense (the rightward sense in FIG. 4) based on the angle of the $\phi$ axis being $\phi 1$ and the difference between the values X1 and X2 (block 710). The control apparatus provides a command for moving the workpiece W in the above described sense, whereby the workpiece W is moved rightward (block 712). Likewise, the electrode 209 and the workpiece W come close to each other, and a spark occurs at the point P4, whereupon the difference $\Delta X$ between the position Xs of the point P4 in the X direction and the command X2 is evaluated (blocks 714 and 716). The workpiece W is then returned by a predetermined amount to the point P5 (block 718). Thus, completion of the sensing operation is decided and the command to the above described switch 204 is cleared in response to the decision output, whereby the switch 204 is returned to the original position and thus to the welding voltage source 205 (block 720).

Now referring to FIGS. 2, 5 and 8, a sensing operation in the case where the kind of base metal is B will be described. Such embodiment is different from the embodiment of FIGS. 4 and 7 and can be applied to a case where the angle between two bevel surfaces constituting the welding line WL, i.e. the beveling angle, is not known in advance. The welding line WL in the X axis direction in the embodiment shown constitutes a butt welding line having a beveling, wherein downward welding is intended, and the torch T assumes a vertical posture.

In this subroutine, first a command to the switch 204 is obtained (block 800), whereby the switch 204 is turned to the high voltage source 206 and a high voltage is applied between the electrode 209 of the torch T and the workpiece W. A command for lowering the Z axis, i.e. a command for lowering the torch T is obtained (block 802), whereby the torch T is lowered. A spark occurs at the point P2 (X1, Y1, Z2) and a detected signal is applied from the electric current sensor 207 to the control means in control box 40 of FIG. 2 (see block 804 of FIG. 8, as well). The control means is responsive to the detected signal to receive the positional information (X1, Y1, Z2) concerning the point P2 and the stores the same in a predetermined location (block 806).

In accordance with the sensor command indicating the sensing direction $-X$, the direction of the sensing is decided (block 808) and a move command for rightward moving the workpiece as viewed in FIG. 5 is obtained (block 810). A spark occurs at the point P3 (X2, Y1, Z2) and a detected signal is applied from the electric current sensor 207 to the data processing unit or the control means (block 812). The data processing unit is responsive to the detected signal to enter therein the positional information concerning the point P3 and stores the same in a predetermined location (block 814). Then, a command for returning the workpiece in the sense opposite to the previous movement of the workpiece by a predetermined amount in the X axis direction is obtained (block 816). The above described predetermined amount is properly determined by the magnitude of the welding line WL. Accordingly, the workpiece W is moved slightly leftward in such a situation.

If and when the point P4 (X3, Y1, Z2) is reached, a command for lowering the Z axis is again obtained (block 818), whereby the torch T is lowered (block 820). The detected signal obtained at the point P5 (X3, Y1, Z3) from the electric current sensor 207 (block 822) is applied to the data processing unit and the positional information concerning the point P5 is entered therein, whereby the positional information is stored in a predetermined location (block 824). A command for moving the workpiece W leftward, i.e. in the same sense as that of the previous movement in the X direction, is obtained (block 826) and at the point P6 (S4, Y1, Z3) a detected signal is obtained from the electric current sensor 207 (block 828) and is applied to the data processing unit, whereby the positional information concerning the point P6 is entered in the data processing unit and is similarly stored therein.

Thus, completion of the sensing operation is decided based on storage of the fourth piece of positional information responsive to the fourth input of the detected signal from the electric current sensor 207 (block 832), and the intersection of the line extending between the points P2 and P6 and the line running between the points P3 and P5 is evaluated (block 834), thereby obtaining the positional information concerning the point P7, and the operation returns to the routine shown in FIG. 6.

Thus, the sensing of the initiating point of welding is completed. Then, referring again to FIG. 6, a further decision is made for example, as to whether or not it is necessary to correct the initiating position in consideration of unevenness of the thickness of the workpiece W (block 610). If it is not necessary to correct the initiating position, the above described initiating position as evaluated by the routine of the sensing A or the sensing B is stored. If it is necessary to correct the initiating position, a correction value is added to the positional information concerning the initiating point thus evaluated to correct the same (block 614), and, in case of the FIG. 5 example, the initiating point being the point P7 is corrected to the point P8, and the positional information concerning the initiating point, thus corrected, is stored. Thus, the teaching operation of the initiating position is completed.

Thereafter, a sensing operation of the terminating position of welding is carried out. In this case as well, an operation button of the remote control panel 50 is operated to bring the welding torch to the vicinity of the terminating point (block 616). Thereafter, the data processing unit or the control means makes a decision as to which pattern the workpiece belongs to, the pattern 1, 2 or 3 (block 618). In case of the pattern 1 or 2, a further decision is made as to which kind of the base metal the workpiece belongs to, A or B (block 620). If the decision is the pattern 3, the position in the vicinity of the above described terminating point is stored for one step (block 622) and then the kind of the base metal is decided (block 620). If the kind of the base metal is A, then the terminal position is sensed in accordance with the above described routine of the sensing A (block 624). If the kind of base metal is B, then the terminating position is sensed by the above described routine of sensing B (block 626). Thereafter, a decision is made as to whether correction is to be made (block 628) and, if correction is made (block 630), the positional information concerning the corrected position is stored as positional information concerning the terminating point (block 632) if correction is not made, then the positional information of the position, not corrected, is stored as the positional information concerning the terminating point (block 632). The initiating point and the terminating point of the welding line are thus sensed and taught.

Figure 8:
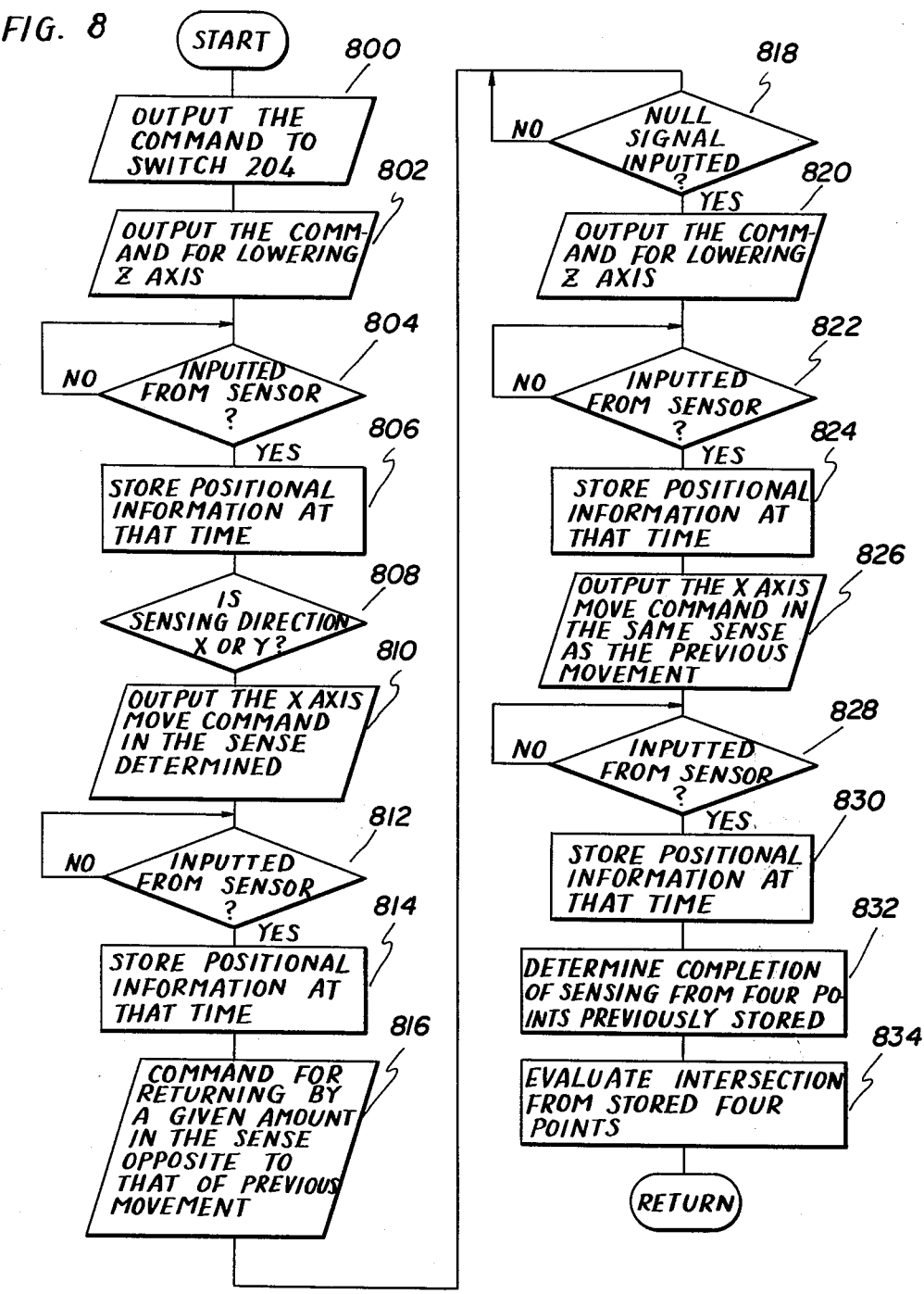
FIG. 8 is a flow diagram showing a sensing operation in case of beveling welding.
Figure 9:
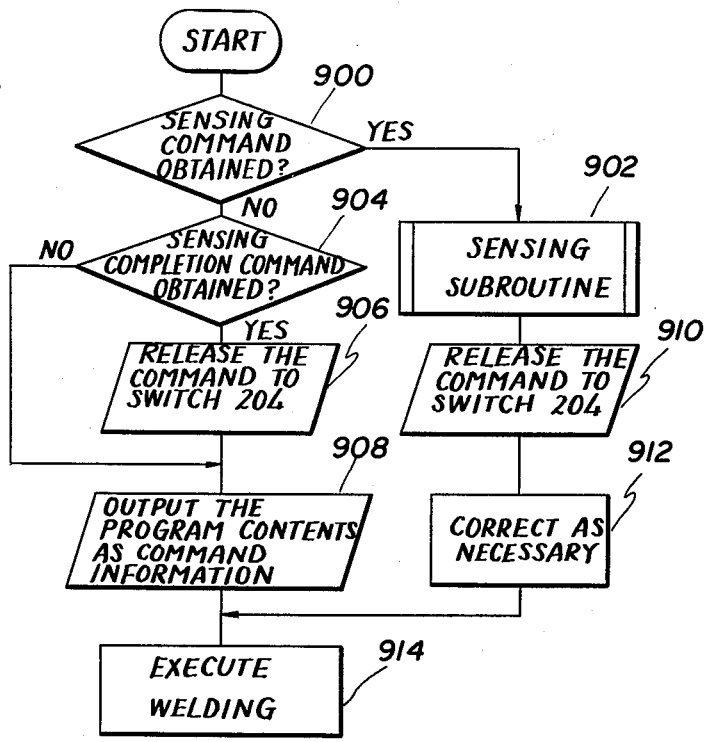
FIG. 9 is a flow diagram showing an operation of the present invention in an automatic welding mode.

After the teaching mode is completed as described above, an automatic welding mode as shown in the FIG. 9 flow diagram is started. The shift to the automatic welding mode is achieved by switching the control in control box 40 of FIG. 2 to an automatic mode and depressing a start button, not shown. Then, the control means, not shown, included in the control box 40, makes a decision as to whether a sensing command is present (block 900 of FIG. 9), i.e. whether sensing is required on the occasion of automatic welding, based on which pattern, the pattern 1, 2 or 3, the workpiece belongs to. If a sensing command is available, the subroutine (block 902, also shown in detail in FIG. 7 or 8) is initiated.

If a sensing command is not available, then a decision is made as to whether or not a sensing completion command is available. If the sensing completion command is available, the control means release the command to the switch 204 (block 904), thereby to connect the voltage applying means 203 and the welding voltage source 205 shown in FIG. 2. Once the latter is done, or if the sensing completion command is not available, i.e. the command is released, then the positional information and control information programmed in the above described teaching mode are outputted for execution of welding (block 908).

Figure 7:
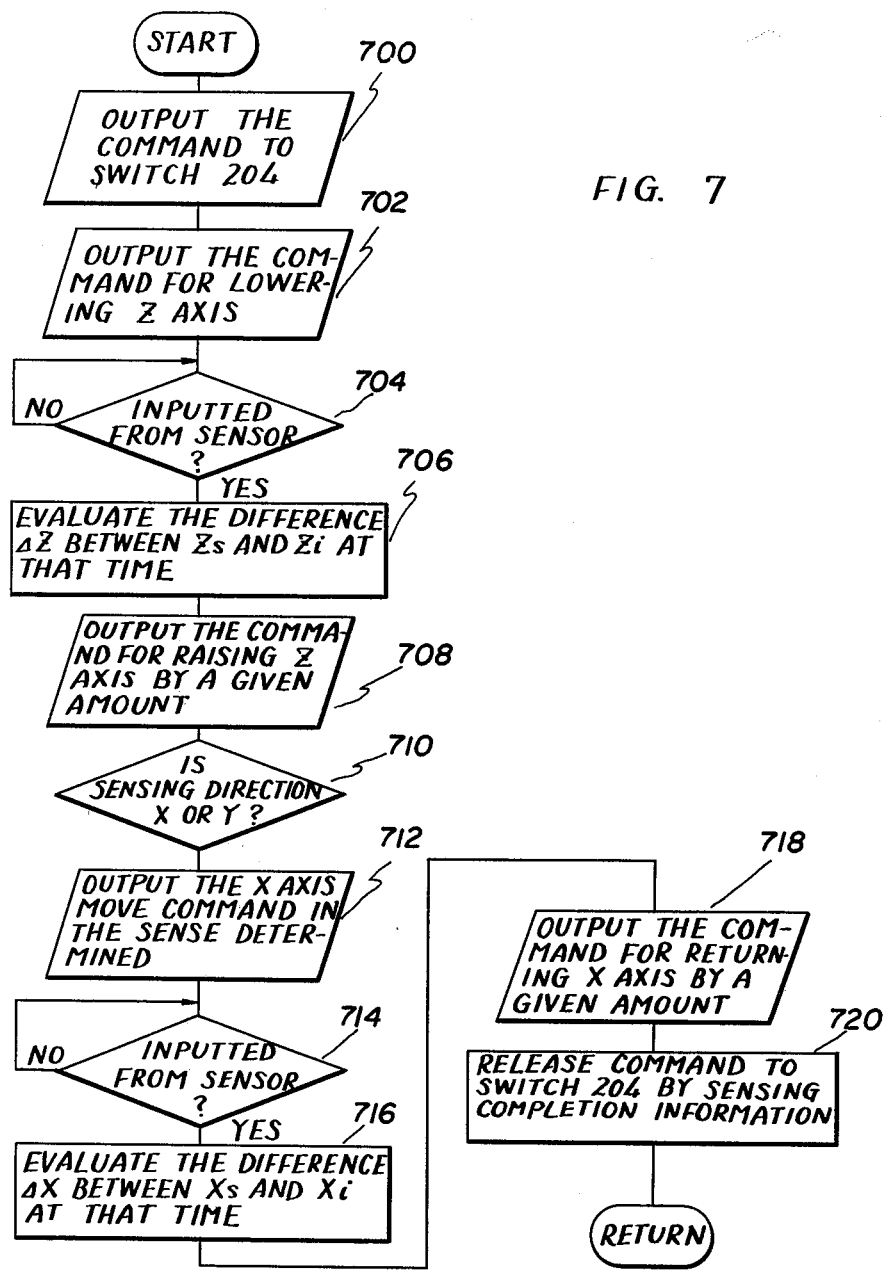
FIG. 7 is a flow diagram showing a sensing operation in case of fillet welding.

If and when the subroutine shown in FIGS. 7 and 8 is completed and the routine shown in FIG. 9 is resumed, the control means release a command to the switch 204 (block 910). At the same time, correction is made if correction of the sensed position is required because of unevenness of the thickness of the workpiece and the like (block 912), whereupon the corrected positional information is applied to execute welding (block 914).

According to the embodiment shown in FIGS. 5 and 8, even if the welding line WL is of a beveling geometry which is not predetermined, the intersectional of the side surfaces is evaluated, whereby the geometry of the beveling is decided, whereupon a welding target position most suited for the best welding result can be determined. Although the embodiment shown was described as executing welding along a straight welding line WL, alternatively, the welding line WL may be curved, in which case all the target positions of the torch T at the initiating point, the respective points along the curve, and the terminating point are evaluated in advance, whereupon the respective points are traced in sequence by a PTP control.

Figure 10:
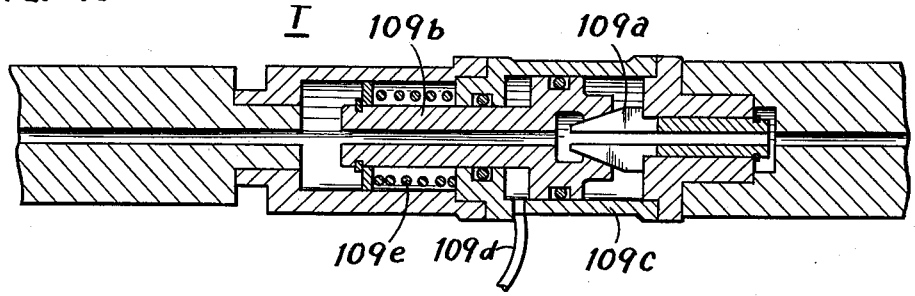
FIG. 10 is a sectional view of a preferred embodiment of a consumptive electrode type welding torch for use in the present invention.

FIG. 10 is a sectional view of a portion of a preferred embodiment of the welding torch T of the wire extension type. Referring to FIGS. 2 and 10, the welding torch T shown comprises a collet chuck 109a for allowing passage of a consumptive electrode 209 fed through a hollow portion of the collet chuck 109a from the electrode supply means 201, a fastening single-acting piston 109b for fastening the collet chuck 109a, a cylinder 109c for receiving the piston 109b, and a pipe 109d for flow of a high pressure fluid, such as a high pressure gas in a shield gas bomb, in and out of the cylinder 109c. Referring to FIG. 10, the left side is the tip end of the torch T and the right side is connected to a flexible pipe, i.e. an electrode shaping apparatus 202, shown in FIG. 2. The consumptive electrode 209 fed from the consumptive electrode supply means 201 is withdrawn through the hollow portion of the collet chuck 109a and from the tip end of the welding torch 109. Normally, the piston 109b is urged leftward, as viewed in the figure, by means of a spring 109e, whereby the collet chuck 109a is released. Accordingly, the consumptive electrode 209 can be moved freely in the welding torch T. For example, if it is necessary to clamp the consumptive electrode 209 in the sensing mode, then a high pressure fluid is fed from the above described pipe 109d, whereby the piston 109 is pushed rightward, as viewed in the figure. Accordingly, the collet chuck 109a is fastened by the tip internal periphery of the piston 109b, with the result that the consumptive electrode 209 is clamped.

In the case where the electrode is a consumptive electrode, the length of the electrode portion protruding from the welding torch is not necessarily constant at the time of completion of the welding operation. In addition, in the case where a flexible pipe 202 is coupled between the fixed consumptive electrode supply means 201 and the movable torch such that a consumptive electrode 209 is allowed to pass therethrough, there is the possibility that the above described length of protruding electrode will vary. Accordingly, the protruding length is not necessarily constant, even at the start of the welding operation. Therefore, several examples of operation for eliminating instability on the occasion of sensing, and thus welding, by virtue of the above described fluctuation will be described in the following.

According to one example, the following operation is carried out, prior to the sensing operation. More specifically, the welding torch T is brought to a predetermined position of the welding apparatus 10, shown in FIG. 1, or brought into proximity relative to to a predetermined position, whereupon the length of the consumptive electrode 209 protruding from the welding torch T is detected. According to a given example, the outer periphery of the workpiece fixture 15 shown in FIG. 1 is used as a reference position. In this case, as far as the other points are concerned, any position may be used wherein the Z axis direction is maintained at a constant position. For the purpose of the sensing mode, the control box 40 turns the switch 204 to the detecting voltage supply 206, whereby the workpiece fixture 15 is controllably moved, with respect to the Y axis direction and the X axis direction, to predetermined positions, and the arm 17 is controllably moved in the up/down direction, i.e. in the Z axis direction, thereby to bring the outer periphery of the workpiece fixture 15 close to the welding torch T. Because of approach of the tip end of the consumptive electrode 209 of the welding torch T and the workpiece fixture 15, a spark occurs therebetween, whereby a conduction state is detected by the electric current sensor 207. The output signal from the electric current sensor 207 is applied to the control box 40. The control box 40 brings the welding torch T close to the outer periphery of the workpiece fixture 15, i.e. the reference position, thereby to evaluate the Z axis position Zc where a spark starts to occur. Thus, the difference between the said position Zc and the conduction start position Za in the case where the consumptive electrode 209 of a predetermined standard length is protruded is evaluated, whereupon the same is converted into the length of the electrode. Accordingly, through this operation, it follows that a predetermined standard length of the consumptive electrode 209 protruding from the welding torch T and the error of the actual protruding length are evaluated. The consumptive electrode supply means 201 is controlled based on the error thus evaluated, whereby the length of the consumptive electrode is calibrated to the standard length. Alternatively, command information for positional control of the welding torch T may be corrected based on the error thus evaluated. In addition, the value of the protruding length, rather than the above described protruding length error, may be employed as the data for further control. In this case, the consumptive electrode 209 is clamped by the collet chuck 109a by means of the piston 109b shown in FIG. 10. According to such an approach, even if the torch T is rotated on the occasion of the sensing mode, the length of the electrode 209 protruding from the welding torch can always be kept constant. Accordingly, a correct sensing operation can be performed on the occasion of the sensing of the welding line.

It should be appreciated from the foregoing description that the positional relation of the tip end of the consumptive electrode to the welding torch T is always constant because the consumptive electrode is protruded always in the same shape as a function of the shaping apparatus 202 and the protruding length thereof is always constant on the occasion of the sensing operation, so that no problem is caused as to their function as the above described sensor. It is pointed out that if a gas, such as $CO_2$, is adapted to flow along the welding torch T, a much more stabilized sensing operation can be performed.

Depending on the kind of workpieces, a single workpiece could comprise a plurality of welding lines. In such a case, it might be necessary to effect a sensing operation with respect to each of the welding lines. In the above described embodiment, the protruding length of the electrode 209 as protruded from the welding torch T was made constant prior to the sensing operation. If, in such a situation, the protruding length is adapted to be defined by positioning each of the welding lines in proximity to the outer periphery of the workpiece fixture 15 serving as a reference position, then, in the case of such a workpiece having a plurality of welding lines, a longer period of time is required for the sensing operation, and thus for the welding operation. In the following, therefore, a preferred embodiment of the present invention will be described which eliminates the necessity of the above described tiresome processing required in the case of a workpiece having a plurality of welding lines.

FIG. 11 is flow diagram showing another embodiment of an automatic welding mode of the present invention. With reference to FIG. 11 and other related figures, an operation of the FIG. 11 embodiment will be described. At the outset, the electrode protruding from the welding torch T is selected to be a prescribed value of length (block 1100) and clamped in accordance with the operation described in conjunction with FIG. 10 and other related figures. Then, the control means included in the control box 40 provides a sensing command (block 1102). Accordingly, the subroutine of the first cycle sensing operation is read out and is executed (block 1104). The subroutine of the sensing operation in case of the horizontal fillet welding was described with reference to FIG. 7 and the subroutine of the sensing operation in case of the butt bevel welding was described with reference to FIG. 8. As a result of execution of the sensing subroutine, the welding line in the workpiece is sensed. Thereafter, the welding command is obtained (block 1104) and the welding operation is performed along the sensed welding line. After the welding operation is completed (block 1106), a position for flee away is commanded for the purpose of bringing the welding torch T to a given flee away position (block 1108). Thereafter, a decision is made as to whether or not all the welding operation with respect to the workpiece is completed (block 1110). If all the welding operation has been completed, a further processing is achieved following the welding operation and, if the workpiece still has the welding line left unwelded, then a decision is made as to whether it is necessary to make the length of the electrode the same as that in the case of the previous sensing operation, i.e. whether or not the command for defining the protruding length of the electrode is obtained. A command for defining the protruding length may be programmed in advance in the teaching mode or may be programmed to be provided automatically upon completion of a series of welding lines (block 1112). If the command is obtained, then a decision is made as to which direction in accordance with the ordinate axes is for use in adjusting the protruding length, the horizontal or vertical direction, i.e. the X axis (or the Y axis) or Z axis. At that time, if the axis is the horizontal direction, i.e. the X axis (or the Y axis), then the previous welding position, i.e. $X+\Delta X$ (or $Y+\Delta Y$) is provided as a command position (block 1116). Accordingly, the welding torch T is moved to the command position, with those other than the commanded axis being maintained in the previous flee away position. If the axis being controlled is the vertical direction, i.e. the Z direction, then similarly the previous welding position $(Z+\Delta Z)$ is provided as a command position (block 1118). Accordingly, the welding apparatus is position controlled, with the commanded value for only the Z axis, with the other axes being maintained in the previous flee away positions.

Thereafter the control apparatus makes a decision as to whether the welding torch T has reached the previous command position (block 1120) by a null or clock signal. If the command position has been reached, then the control apparatus provides a command for feeding the electrode to the consumptive electrode supply means 201 shown in FIG. 2 (block 1122 of FIG. 11). At that time, the consumptive electrode 209 has been connected to the detecting high voltage source 206 by means of the voltage applying means 203. If an output is obtained from the current sensor 207 (block 1124), a command is applied to the supply means 201 to stop feeding the electrode (block 1126). Thus, in the second and further sensing operations of the welding lines with respect to one workpiece, the surface position of the workpiece is used as a reference position for the purpose of defining the protruding length of the consumptive electrode 209 prior to the sensing operations. The surface position of the workpiece has been decided in the previous first sensing operation. Thus, it is not necessary to return the welding torch T each time to the vicinity of the reference position member such as the workpiece fixture 15, for example, with the result that the cycle time required can be shortened. In the foregoing, the FIG. 11 embodiment was described as embodied in case of a horizontal fillet welding as shown in FIG. 4. However, the FIG. 11 embodiment can be equally practiced in case of a butt welding operation having the beveling as shown in FIG. 5. In the latter described case, however, the defining of the protruding length cannot be achieved with respect to the horizontal direction, i.e. the X axis (or the Y axis). Accordingly, the positional information concerning a given point on the surface of the workpiece in the vicinity of the beveling, for example, should be obtained in advance as a command position.

Figure 12:
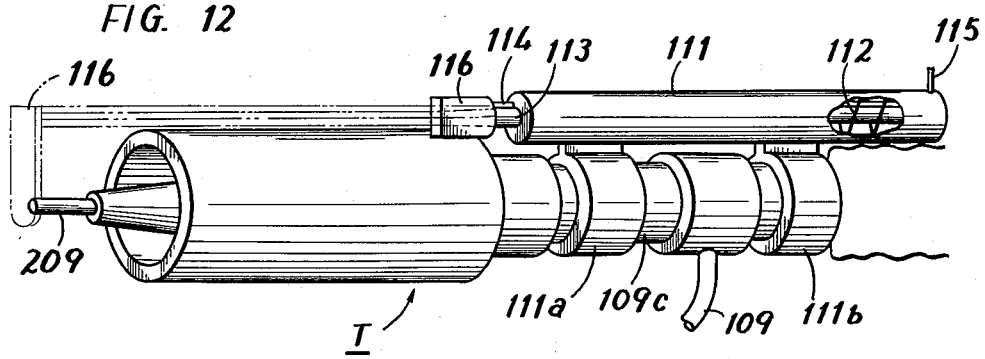
FIG. 12 is a perspective view of another preferred embodiment of a consumptive electrode type welding torch for use in the present invention.

FIG. 12 is a perspective view of another preferred embodiment of the welding torch T. The FIG. 12 embodiment comprises a reference portion 116 provided in addition to the welding torch T shown in FIG. 10. More specifically, the welding torch T comprises a cylinder or guide sleeve 111 provided adjacent thereto and in parallel therewith by means of rings 111a and 111b. The guide sleeve 111 comprises a single acting piston or rod 113 inserted therethrough. The outer side surface of the rod 113 is formed of a protrusion 114, such that the protrusion 114 fits into a groove formed at the tip end of the guide sleeve 111. In addition, as shown in a fragmentary manner in FIG. 12, the guide sleeve 111 receives a spring 112 therein. The spring 112 is provided in the guide sleeve 111 to exert a spring force to urge the rod 113 inserted therein toward the base end of the welding torch T, i.e. in the rightward direction as viewed in the figure. The spring 112 normally remains expanded and is compressed as necessary by means of a high pressure fluid flowing into the pipe 115, for example.

As seen in FIG. 12, the protrusion 114 of the rod 113 is curved at the angle of 90° at a given position, thereby to form a so-called spiral shape. In addition, the tip end of the rod 113 is formed of a base portion or a reference portion 116 curved at the right angle.

According to the embodiment shown, a further operation to be described subsequently is performed before the sensing operation. More specifically, the welding torch T as shown in FIG. 12 is brought into proximity with a predetermined position of the welding apparatus 10 shown in FIG. 1, thereby to make constant the length of the consumptive electrode 209 protruding from the welding torch T. In the embodiment shown, the reference portion 116 shown in FIG. 12 is assumed to be a reference position. Therefore, the reference portion 116 is first positioned in front of the welding torch 109. More specifically, normally the spring 112 has been expanded, so that the piston or rod 113 is housed in the guide sleeve 111 so as to extend throughout the total length thereof. Accordingly, the reference portion 116 provided at the tip end of the rod 113 is maintained in such a manner as to be directed in the illustrated direction at the position as shown in a solid line. As necessary, i.e. before the sensing operation, the spring 112 is compressed by allowing a high pressure fluid to flow into the sleeve 111 through the pipe 115. Accordingly, the rod 113 comes to protrude from the guide sleeve 111. At that time, the rod 113 is turned by 90° in accordance with the protrusion, because the protrusion 114 of the rod 113 has become engaged with the groove of the guide sleeve 111 and the protrusion 114 has been curved by 90° at a given position. Accordingly, the reference portion 116 of the rod 113 is displaced from the position as shown in the solid line in FIG. 12 to the position as shown in the two dotted lines in FIG. 12, while the direction is turned by 90°. Accordingly, the tip end of the consumptive electrode 209 can be in contact with the reference portion 116. It has been adapted such that the length of the rod 113, as fully pushed out by means of the high pressure fluid, i.e. the position of the reference portion 116 in such situation, will always come to a predetermined position spaced apart from the tip end of the torch T. Accordingly, the reference portion 116 may be employed as a reference position.

Thereafter, referring to FIG. 2, the control means in the control box 40 acts on the consumptive electrode supply means 201 in the voltage source 20, thereby to supply the consumptive electrode 209 to the welding torch T. At that time, the switch 204 has been turned to the detecting voltage source 206 by means of the control means for the purpose of the sensing operation. Accordingly, if and when the tip end of the consumptive electrode 209 comes close to the above described reference portion 206, a spark occurs between the consumptive electrode 209 and the reference portion 116. Therefore, a detected output signal is obtained from the current sensor 207 and the supply means 201 is disabled by means of the control means. Thus, the reference portion 116 is positioned so as to be spaced apart a predetermined distance from the tip end of the welding torch T, when the consumptive electrode 209 is brought into proximity with the reference portion 116, with the result that the protruding length of the consumptive electrode 209 is always constant. Thereafter, the collet chuck 109a is fastened by means of the piston 109b, whereby the consumptive electrode 209 is clamped.

In the above described embodiment, inward and outward flow of the high pressure fluid by means of the pipes 109d and 115 may be manually controlled by a valve, not shown, or alternatively such valve may be automatically switched in response to a signal obtainable from a program.

Figure 13:
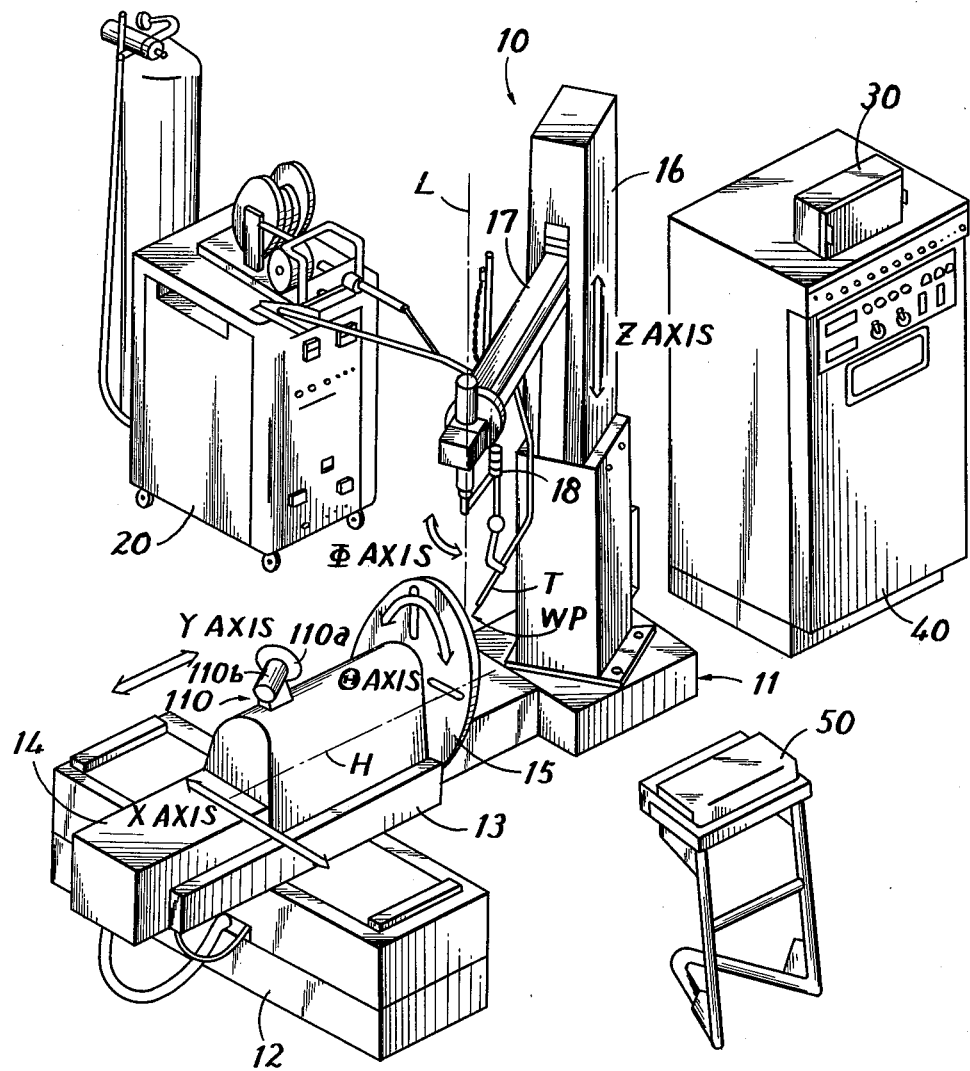
FIG. 13 is a perspective view of another example of an automatic welding apparatus, wherein the present invention can be employed.
Figure 14:
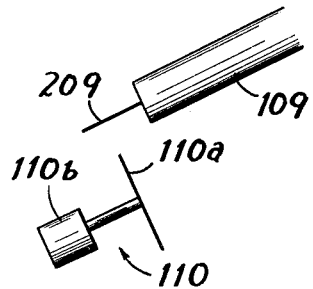
FIG. 14 is a side view of an arrangement of a rotary grinding stone and a consumptive electrode.

In another embodiment of the present invention as shown in FIGS. 13 and 14, a consumptive electrode cutting means 110 is provided on the upper end of a frame 14. The consumptive electrode cutting means 110 comprises a grinding stone 110a and a motor 110b for rotating the grinding stone 110a. The motor 110b is controllably rotated by means of the control means included in the control box 40. The grinding stone 110a may be a thin disc of such material as, for example, a resin grinding stone.

According to the embodiment shown, the operation to be described in the following is carried out before the sensing operation. More specifically, the protruding length of the consumptive electrode 209 protruding from the welding torch T is kept constant by means of the consumptive electrode cutting means 110 as shown in FIGS. 13 and 14. To that end, the control means included in the control box 40 first controls of position of the workpiece fixture 15, and thus the consumptive electrode cutting means 110, to a predetermined position, spaced apart a predetermined distance from the third frame 16, in terms of the X axis direction and the Y axis direction. Thereafter, the arm 17 is controlled in the Z axis direction. Then the supply means 201 is controlled, whereby a given amount of the consumptive electrode 209 is protruded from the tip end of the welding torch T. As a result, a given position on the side surface of the consumptive electrode 209, as protruded from the tip end of the welding torch T, comes to be faced to the periphery or blade edge of the rotary grinding stone 110a. The consumptive electrode 209 is clamped by means of the collet chuck 109a as actuated by the piston 109b. Thereafter, the welding torch T is positioned to the blade edge of the rotary grinding stone 110a and the motor 110b is enabled, so that the grinding stone 110a is rotated. Accordingly, the consumptive electrode 209 as protruded from the body of the welding torch T is cut at a predetermined length. Even if the welding torch 109 is rotated in such situation, the length of the electrode 209 protruded from the welding torch 109 is kept always constant. It is pointed out that the cutting means may be scissors or cutters, apart from the above described rotary grinding stone.

Generally, the optimum values of the welding voltage applied between the electrode and the workpiece and the welding current flowing therebetween as determined experimentally based on the thickness of the workpiece, the state of beveling, the thickness of the electrode and the like, have been commanded in the teaching mode. However, unless the protruding length of the electrode is constant in the sensing mode, the voltage and current in the automatic welding mode are not maintained constant or at optimum values, because the automatic welding mode is carried out based on the information obtained in the sensing mode. Assuming that the sensing operation is performed with the protruding length being shorter, for example, then, the resistance of the electrode in the welding operation is small, and the current becomes larger and the voltage becomes smaller. As a result, the voltage and current values become different from the optimum voltage and current, and welding of a desired finishing or quality cannot be achieved.

Therefore, according to a further embodiment of the present invention, the collet chuck 109a is fastened by means of the piston 109b shown in FIG. 10 in a given state, for example, whereby the consumptive electrode is clamped at a given constant protruding length, whereupon the sensing operation is performed.

Figure 15:
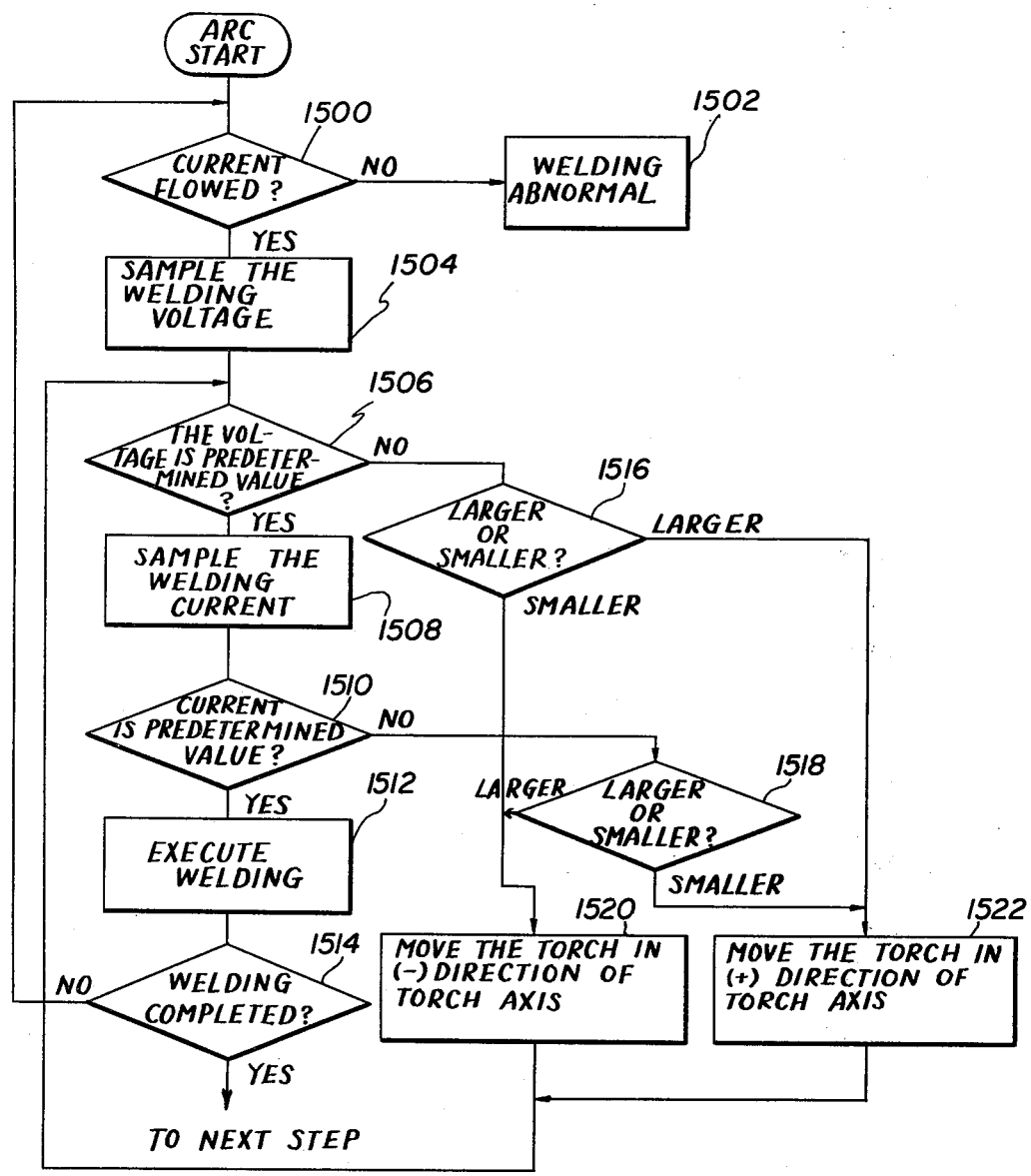
FIG. 15 is a flow diagram showing another operation of the present invention in an automatic welding mode.

Thereafter, the automatic welding mode is effected. In the automatic welding mode, as shown in the FIG. 15, flow diagram, control is effected such that an arc occurs between the consumptive electrode 209 of the welding torch T and the workpiece, not shown. If no current flows between the consumptive electrode and the workpiece at that time (block 1500), a decision is made to the effect that the welding is abnormal (block 1502), whereupon the abnormality is warned by means of a warning apparatus, for example. If a welding current flows (block 1500), then the welding voltage at that time is sampled (block 1504) and the data thus obtained is loaded in the control means included in the control box 40. The control means makes a decision as to whether or not the above described sampled welding voltage approximates a predetermined value as preset in the teaching mode (block 1506). If the welding voltage is within a predetermined value range, then the welding current is sampled (block 1508) and the sampled welding current is loaded in the control means. The control means makes a decision as to whether or not the above described sampled welding current is in the predetermined value range as taught (block 1500). If the welding current is also within the predetermined value range, then the welding is continued (block 1512) until termination of the welding (decision block 1514), upon which the next step follows.

If and when the welding voltage is outside the predetermined value range, then the control means makes a decision as to whether the same is larger or smaller than a predetermined value (block 1516). Similarly, if the welding current is outside the predetermined value range, then the control means makes a decision as to whether the same is larger or smaller than the predetermined value (block 1518). If the welding voltage is smaller than a predetermined value and the welding current is larger than a predetermined value, then this means that the tip end of the welding torch makes a sensing operation in a state too close to the workpiece, the position is controlled responsive thereto, and accordingly the control means serves to move the welding torch in the minus direction of the torch axis (block 1520). More specifically, since the tip end of the torch is too close to the workpiece, the torch is controllably moved away from the workpiece.

If and when the welding voltage is higher than a predetermined value and the welding current is smaller than a predetermined value, then this indicates that the tip end of the torch is too far away from the workpiece. Accordingly, the control means serves to control the welding torch such that the same is moved in the plus direction of the torch axis (block 1522). In other words, the tip end of the welding torch is controllably moved in the direction toward the workpiece.

If the controlling movement of the welding torch in the minus direction or the plus direction is completed, the welding voltage and/or the welding current are again sampled, and a decision is made as to whether or not the sampled value (s) is (are) within the predetermined value range (blocks 1506 and 1510). Thus, the welding voltage or the welding current in the automatic welding mode is controlled to be in the preset value range of the welding voltage or the welding current as preset in the teaching mode. This means that the automatic welding operation is performed in such a state that the protruding length of the consumptive electrode is protruded so as to substantially satisfy the welding voltage and the welding current as preset in the teaching mode.

Figure 16:
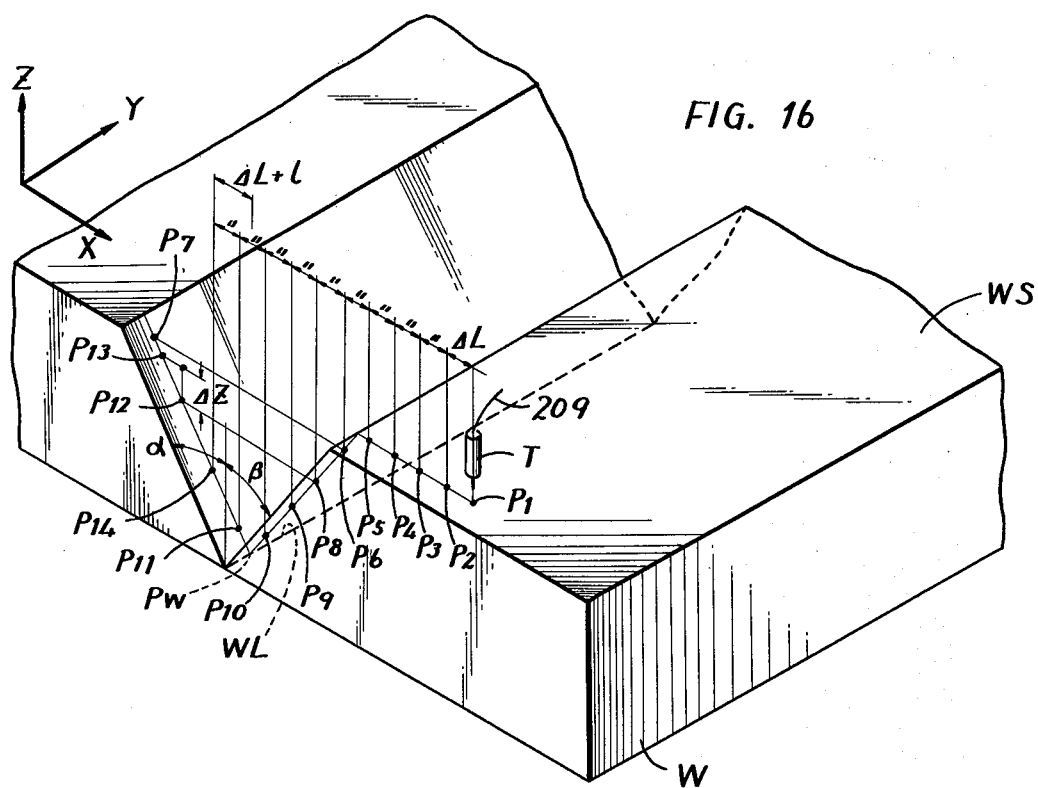
FIG. 16 is a perspective view showing another example of a method for detecting a beveling which is employed in the present invention.
Figure 17A:
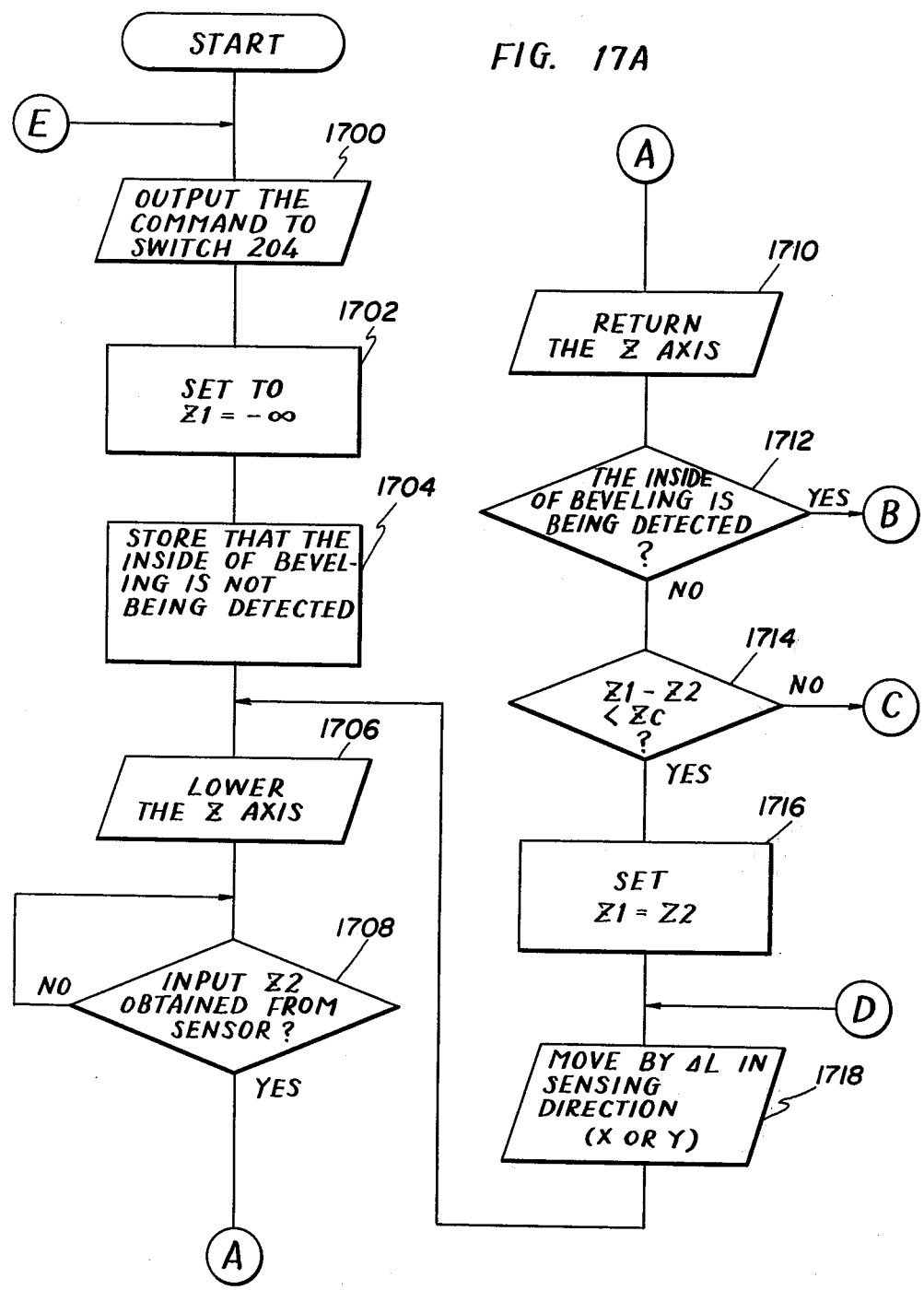
FIGS. 17A and 17B are flow diagrams showing an operation for detecting a beveling.
Figure 17B:
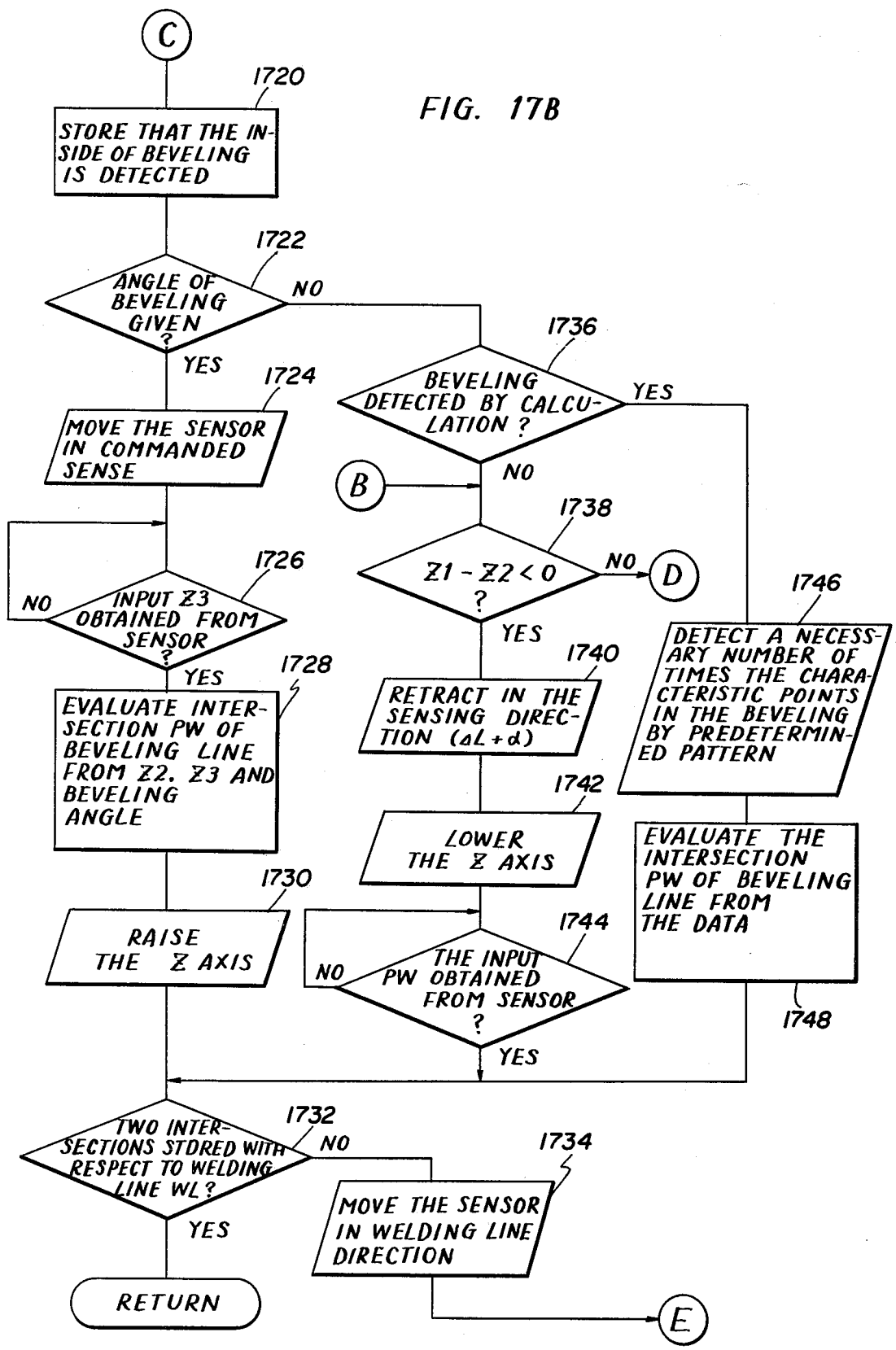

FIG. 16 is a perspective view showing another example of a technique for detecting the beveling for use in the present invention. The detecting method of this example will be described in more detail with reference to the flow diagram of the subroutine shown in FIGS. 17A and 17B. To that end, the surface WS of the workpiece W is set in advance at approximately a right angle with respect to the control axis Z or the sensor direction. The welding torch T is then controlled to be above the point P1 responsive to a position command. The point P1 is predetermined to be at a position slightly spaced apart in the direction intersecting the welding line WL in the vicinity of one end of the welding line WL, and the data representative thereof is programmed in advance.

When this subroutine is initiated, a command to turn the switch 204 is first obtained (block 1700), whereby the voltage of the detecting voltage source 206 is applied to the consumptive electrode 209. The Z axis position Z1 in the control means in the control box 40 is set to $-\infty$ (block 1702). The information representing the fact that the inside of the beveling is not being detected is further stored (block 1704). The welding torch T is then commanded to be lowered in the Z axis direction (block 1706). Alternatively, the workpiece W may be raised in the Z axis direction. In the following, the description will be made based on the presumption that the welding torch T is moved. The tip end of the electrode of the welding torch T approaches the workpiece and detection is made as to whether or not a detected signal is obtained. If a detected signal is obtained (block 1708), the value Z2 of the welding torch T in the Z axis direction is loaded. Then the welding torch T is returned in the Z axis direction (block 1710).

Thereafter, a decision is made as to whether or not the internal side of the beveling is being detected by the welding torch based on the loaded information in the data processing unit (block 1712). If the welding torch T is not detecting the inside of the beveling, then a shift is made to the next step (block 1714). If the welding torch T is detecting the inside of the beveling, then a jump through Ⓑ to the step "$Z1-Z<Zc$?" (block 1738) is executed. If the welding torch T is not detecting the inside of the beveling, then a decision is made as to the step "$Z1-Z2<Zc$?" (block 1714). It is pointed out that Zc is a constant as inputted in advance to the data processing unit or the control means.

If and when $Z1-Z2<Zc$ is true, then Z1 is set equal to Z2 (block 1716) and the welding torch T is moved by $\Delta L$ in the sensing direction, or in the X direction and in the sense of $-X$ in this situation, with the value of Z2 as Z1 (block 1718). The above described step "lower the Z axis" (block 1706) is reexecuted to evaluate the following point P2. Thus, the same operation is repeated for each of the points P2, P3, . . . .

If and when the sensor, i.e. the welding torch T reaches the point P6-- in other words, the welding torch T comes within the beveling-then the relation "$Z1-Z2<Zc$" becomes false when the control means is loaded with the information indicating that the inside of the beveling is being sensed (block 1720), and a decision is made as to whether or not the angles $\alpha$ and $\beta$ of the beveling have been stored in advance in the data processing unit (block 1722). If such angles have been stored in the data processing unit, then the welding torch T is moved in the designated direction (block 1724), in this case in the $-X$ direction. If the sensor signal—i.e., the position signal obtainable at the position P7—is obtained from the current sensor 207 (block 1726), then the positional information Z3 is loaded. Based on the information thus obtained, including (X2, Z2), (X3, Z3), $\alpha$, $\beta$, the intersection point PW (Xf, Zf) of the beveling line is evaluated (block 1728) and is stored in the data processing unit. Then the welding torch T is slightly raised (block 1730), and a decision is made as to whether or not the information concerning two points of the intersection point PW is stored with respect to the welding line WL. If so, a command for moving the welding torch T in accordance with a linear interpolation between these two points PW is obtained. If two points of such point PW are not available, then the welding torch T is moved in the direction of the welding line WL (block 1734), in this case in the Y direction, so as to be positioned at the other end of the welding line WL, whereupon the progress of execution is returned to the start through Ⓔ. If in the previous decision step "the angle of beveling given ?" (block 1720) the decision is that the angles $\alpha$ and $\beta$ have not been loaded, then a further decision is made as to whether or not a command for evaluating the point PW through calculation is included or not (block 1736). If the point PW is to be evaluated through calculation, then the predetermined pattern, for example the points P6, P8, P12, P13 in FIG. 15 and the characteristic points in the beveling are sensed a necessary number of times (block 1746), whereupon the positional information Z6, Z8, Z12, Z13 are loaded. The point PW is evaluated through calculation based on these pieces of positional information (block 1748) and is loaded. Then the progress of execution is returned to the step (block 1732 after "raise the Z axis" (block 1730).

It the point PW is not to be evaluated through calcuation, then a decision is made as to whether or not "$Z1-Z2<0$" is met (block 1738).

If not, the progress of execution is returned to the step (block 1718) "set $Z1=Z2$" (block 1716). If so, by presuming that the welding torch T has already crossed the welding line W1—for example moving from the point P11 to the point P14—the welding torch T is returned in the sensing direction by the value $(\Delta L+1)$, where $1=\Delta L/3$ (block 1746). However, the above described returning value should not be construed by way of limitation, inasmuch as any appropriate small value close to the point PW may be used depending on the angles $\alpha$ and $\beta$. Thereafter, the welding torch T is lowered in the Z axis direction (block 1742) and, if the sensing signal is inputted at that time (block 1744), the position a that time is deemed as PW and is loaded, whereupon the progress of execution is returned to the step (block 1732) "raise Z (block 1730) axis". According to this method, assuming that the angles $\alpha$ and $\beta$ are 45°, $\Delta L$ is 2 mm and l is 1 mm, and the detection accuracy is within ±1 mm.

Figure 18:
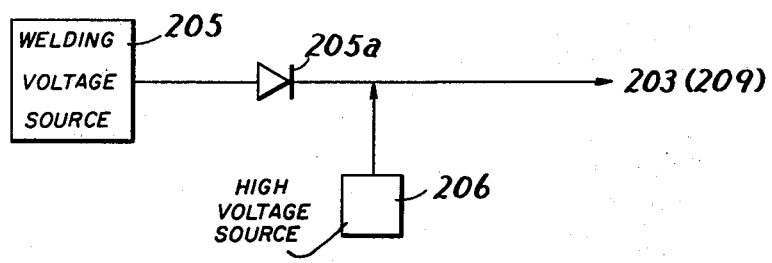
FIGS. 18 and 19 are diagrams showing a basic concept of another example for selective switching of a welding voltage supply and a detecting voltage supply.
Figure 19:
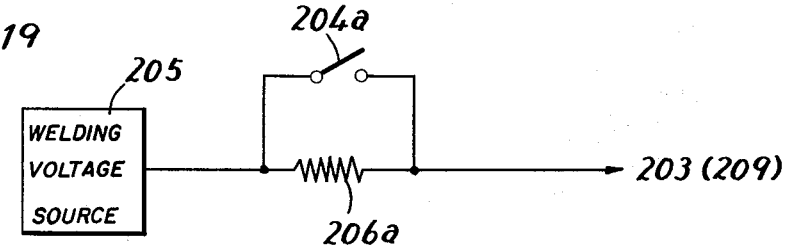

In the above described embodiment, a switching operation between the welding voltage source 205 and the detecting high voltage source 206 is achieved by means of a mechanical switch 204, but alternatively the embodiment shown in FIGS. 18 and 19 may be considered. Referring to FIG. 18, the welding voltage source 205 is applied to the voltage applying means 203, i.e. the consumptive electrode 209, through a unidirectional device 205a such as a diode. The detecting high voltage source 206 is coupled to the output side of the diode 205. The high voltage source 206 may comprise an oscillator for generating a high frequency voltage which is enabled in the sensing mode. Accordingly, in the FIG. 19 embodiment, the voltage from the welding voltage source 205 and the high frequency voltage from the detecting high voltage source 206 are superimposed, and the resultant composite voltage is applied to the consumptive electrode 209 in the sensing mode. Meanwhile, the detecting voltage source 206 is disabled in the welding mode.

According to the FIG. 19 embodiment, the welding voltage source 205 is connected to the voltage applying means 203 through a current limiting resistor 206a. The current limiting resistor 206a is shunted by a switch 204a. In the welding mode, the switch 204a is closed, so that the current limiting resistor 206a is shunted. Accordingly, the consumptive electrode 209 is directly supplied with the output of the welding voltage source 205. In the sensing mode, the switch 204a is opened, so that the current limiting resistor 206a is rendered effective. Accordingly, in the sensing mode, the voltage from the welding voltage source 205 is applied through the resistor 206a to the consumptive electrode 209. The current limiting resistor 206a functions to limit the current in the sensing mode to an extremely small value as compared with that in the welding mode.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic welding apparatus for performing welding operations between a welding torch having a tip end and including an electrode, and a workpiece having a welding line, said workpiece being fixed to a workpiece fixture, said welding operation being performed in accordance with a desired relative positional relation between said welding torch and said workpiece fixture, said apparatus comprising:

present positional information generating means operatively connected to said welding torch and said workpiece fixture for generating present positional information representative of the present positions of said welding torch and said workpiece fixture, control means including storage means for storing command positional information concerning the desired relative positional relation between said welding torch and said workpiece fixture as programmed in advance, said control means being responsive to said command positional information and said present positional information for controlling the relative positional relation between said welding torch and said workpiece fixture to said desired relative positional relation for automatically welding said welding line of said workpiece by means of said electrode of said welding torch, voltage supply means coupled to said electrode of said welding torch for supplying a voltage to said electrode of said welding torch, said voltage supply means having a sensing mode and a welding mode, mode selecting means operatively coupled to said voltage supply means for selectively changing the mode of said voltage supply means to a selected one of said sensing mode and said welding mode, means operatively coupled to said electrode of said welding torch for detecting an electric current conduction state in said electrode in said sensing mode, and means responsive to the output of said electric current conduction state detecting means for supplying said present positional information of said present positional information generating means to said control means.

2. An automatic welding apparatus in accordance with claim 1, wherein said control means is adapted to be responsive to the output of said electric current conduction state detecting means to evaluate relative positional information concerning a present relative positional relation between said welding torch and said workpiece fixture based on said present positional information representative of the present positions of said welding torch and said workpiece fixture.

3. An automatic welding apparatus in accordance with claim 2, wherein said control means is adapted to correct said command positional information as programmed in advance based on said relative positional information concerning the present relative positional relation between said welding torch and said workpiece fixture.

4. An automatic welding apparatus in accordance with claim 3, wherein said control means is adapted to evaluate information concerning said welding line based on said information concerning said relative positional relation.

5. An automatic welding apparatus in accordance with claim 4, wherein said control means is adapted to bring said electrode of said welding torch and said workpiece into proximity with respect to each other at a plurality of point positions crossing said welding line, and to evaluate said positional information concerning the desired relative positional relation between said welding torch and said workpiece in response to the output of said electric current conduction state detecting means of said electrode in such situation, whereby one welding point position along said welding line is evaluated based on positional information concerning said plurality of point positions.

6. An automatic welding apparatus in accordance with claim 4, wherein said workpiece has a beveling which is butt welded, and said control means comprises:

first means for detecting a first position on the surface of said workpiece in the vicinity of said beveling for providing a first piece of data representing said first position, additional storage means for optionally programming in advance the angle of the beveling of said workpiece, second means for detecting a second position on the surface of said workpiece closer to said beveling and spaced apart by a predetermined distance from said first position on the surface of said workpiece for providing a second piece of data representative of said second position, third means for evaluating a difference between said first piece of data and said second piece of data, fourth means for comparing said difference with a predetermined value for providing an error and determining whether said error is smaller or larger than a predetermined value, fifth means operatively connected said additional storage means and said fourth means for determining whether or not the angle of said beveling has been provided by programming in advance when said error is larger than said predetermined value, sixth means for detecting a third position on the surface of said beveling at the opposite side for providing a third piece of data, when the angle of beveling has been provided in advance, and seventh means for evaluating an intersection of the beveling line based on said second piece of data and said third piece of data.

7. An automatic welding apparatus in accordance with claim 6, wherein said control means is further adapted to detect two point positions for each beveling surface, including said second position, if and when the angle of beveling has not been provided by programming in advance as determined by said fifth means for evaluating said intersection of said beveling line based on these pieces of data.

8. An automatic welding apparatus in accordance with claim 7, wherein said control means is adapted to detect a further position on the surface spaced apart the same predetermined distance, if and when the angle of beveling has not been provided by programming in advance, as determined by said fifth means, for providing a further piece of data and for evaluating the difference between said second piece of data and said first piece of data, and further evaluating a slightly returned position as an intersection of the beveling line, if and when the sign of the difference value changes.

9. An automatic welding apparatus in accordance with claim 1, wherein said voltage supply means comprises a detecting voltage supply and a welding voltage supply, and said switch means comprises a switching means for selectively connecting said electrode of said welding torch to said detecting voltage supply or said welding voltage supply.

10. An automatic welding apparatus in accordance with claim 9, wherein said detecting voltage supply means comprises a high frequency oscillating voltage supply and said switch means comprises switching means for selectively applying the output of said high frequency oscillating voltage supply in superposition to the output from said welding voltage supply to said electrode of said welding torch in said sensing mode, and for selectively applying only the output of said welding voltage supply to said electrode of said welding torch in said welding mode.

11. An automatic welding apparatus in accordance with claim 9, wherein said detecting voltage supply means comprises an electric current limiting circuit provided between said welding voltage supply and said electrode of said welding torch, and said switch means comprises means for selectively actuating said electric current limiting circuit in said sensing mode and deactuating said current limiting circuit in said welding mode.

12. An automatic welding apparatus in accordance with claim 11, wherein said electric current limiting circuit comprises a resistor.

13. An automatic welding apparatus in accordance with claim 1, which further comprises electrode supply means for sequentially supplying a consumptive electrode to said welding torch in accordance with the progress of welding in said welding mode.

14. An automatic welding apparatus in accordance with claim 13, wherein said consumptive electrode is moveable in a longitudinal direction and protrudes from said tip end of said welding torch and wherein said welding torch comprises clamp means for clamping said consumptive electrode with respect to said welding torch tip end when said consumptive electrode protrudes by a predetermined length.

15. An automatic welding apparatus in accordance with claim 14, wherein said clamp means comprises a collet chuck and a fastening means for fastening said collet chuck.

16. An automatic welding apparatus in accordance with claim 15, wherein said fastening means comprises
a cylinder,
a piston slidably fitted in said cylinder for unidirectional movement, and
moving means for moving said piston in accordance with said unidirectional movement.

17. An automatic welding apparatus in accordance with claim 16, wherein said moving means comprises means for supplying a high pressure gas in said cylinder for imparting said unidirectional movement to said piston.

18. An automatic welding apparatus in accordance with claim 13, wherein said electrode supply means comprises shaping means for forcibly shaping said consumptive electrode in a predetermined direction.

19. An automatic welding apparatus in accordance with claim 18, wherein said shaping means comprises a flexible tube shaped in a loop for shaping said consumptive electrode in a curl direction.

20. An automatic welding apparatus in accordance with claim 18, wherein said shaping means comprises a pressing roller for straightening said consumptive electrode.

21. An automatic welding apparatus in accordance with claim 20, wherein the optimum protruding length of said consumptive electrode in said sensing mode is selected to be a standard protruding length and wherein said information concerning the error of said protruding length of said electrode of said welding torch comprises information corresponding to the difference between the actual protruding length of said electrode and said standard protruding length.

22. An automatic welding apparatus in accordance with claim 13, which further comprises a reference position member positioned at a predetermined position of said automatic welding apparatus, and wherein said control means further comprises:
means for switching said voltage supply means to said sensing mode,
means for bringing the tip end of said electrode of said welding torch close to said reference position member, and
means for evaluating information concerning the protruding length of said electrode in response to the output of said electric current conduction state detecting means obtainable when the tip end of said welding torch comes close to said reference position member.

23. An automatic welding apparatus in accordance with claim 22, wherein said reference position member comprises said workpiece fixture.

24. An automatic welding apparatus in accordance with claim 22, wherein said reference position member comprises a predetermined position on the surface of said workpiece fixed on said workpiece fixture.

25. An automatic welding apparatus in accordance with claim 13, which further comprises a reference position member positioned at a predetermined position of said automatic welding apparatus, and wherein said control means comprises:
means for switching said voltage supply means to said sensing mode,
means for feeding said consumptive electrode from said consumptive electrode supply means, and
means for disabling said consumptive electrode supply means in response to the output from said electric current conduction state detecting means obtainable when the tip end of said consumptive electrode comes close to said reference position member.

26. An automatic welding apparatus in accordance with claim 25, wherein said reference position member comprises said workpiece fixture.

27. An automatic welding apparatus in accordance with claim 25, wherein said reference position member comprises a predetermined position on the surface of said workpiece fixed on said workpiece fixture.

28. An automatic welding apparatus in accordance with claim 25, wherein said reference position member comprises a structure integrally provided on said welding torch and positioned at a predetermined position in front of said welding torch.

29. An automatic welding apparatus in accordance with claim 28, wherein said welding torch comprises a displaceable rod, said reference position member is provided at the tip end of said displaceable rod along said welding torch, and said means for positioning at said predetermined position comprises means for swinging said rod from a retracted state to a displaced state of said rod.

30. An automatic welding apparatus in accordance with claim 13, which further comprises
means provided opposite to and spaced apart a predetermined distance from said welding torch for cutting the consumptive electrode protruding from said welding torch, and
trim means for controllably protruding said consumptive electrode by means of said consumptive electrode supply means and for enabling said cutting means.

31. An automatic welding apparatus in accordance with claim 30, wherein said cutting means comprises a rotary grinding stone.

32. An automatic welding apparatus in accordance with claim 30, wherein said cutting means comprises means for shearing said consumptive electrode.

33. An automatic welding apparatus in accordance with claim 1, wherein said control means comprises:
means responsive to the welding mode for detecting at least one of the welding voltage applied to said consumptive electrode and the welding current flowing through said consumptive electrode,
comparing means responsive to the welding mode for comparing said at least one of the detected welding voltage and welding current with a predetermined value, and
controlling means for controlling the position, in the back and forth direction, of said welding torch in response to the output of said comparing means.

34. An automatic welding apparatus in accordance with claim 33, wherein said comparing means comprises:
means for evaluating a difference between said at least one of the detected welding voltage and the welding current, and said predetermined value.

35. An automatic welding apparatus in accordance with claim 34, wherein said controlling means controls the position of said welding torch in the direction for making said difference zero in response to said difference.

36. A method for sensing a welding point in an automatic welding apparatus for performing welding operations between an electrode of a welding torch and a workpiece having a welding line and affixed to a workpiece fixture, the automatic welding apparatus performing the welding operation based on a welding point evaluated responsive to the sensed welding point, the automatic welding apparatus comprising voltage supply means coupled to the electrode of the welding torch for supplying a voltage to the electrode of the welding torch, the voltage supply means having a sensing mode and a welding mode, and mode selecting means operatively coupled to the voltage supply means for selectively changing the mode of the voltage supply means to a selected one of the sensing mode and the welding mode, the sensing method comprising, when the sensing mode is selected by the mode selecting means, the steps of:
controlling the positions of the welding torch and the workpiece fixture such that the electrode is brought in proximity of the welding line,
detecting whether an electrical conduction state has occurred between the electrode of the welding torch and the workpiece,
generating information representative of the position of at least one of the welding torch and the workpiece fixture at the time of detection of the electrical conduction state, and
evaluating the welding point based on the generated information.

37. A method for sensing a welding point in an automatic welding apparatus in accordance with claim 36, which further comprises the steps of:
providing to the automatic welding apparatus command positional information representative of the desired relative positional relationship between the welding torch and the workpiece fixture, and
correcting the command positional information based on the evaluated information with respect to the welding point.

38. A method for sensing a welding point in an automatic welding apparatus in accordance with claim 36, which further comprises the step of evaluating information with respect to the welding line based on the evaluated information with respect to the welding point.

39. A method for sensing a welding point in an automatic welding apparatus in accordance with claim 36, wherein the step of evaluating the welding point comprises the steps of:
bringing said electrode of said welding torch and said workpiece in proximity of a plurality of point positions adjacent the welding line,
evaluating a plurality of pieces of positional information with respect to the plurality of point positions, and
evaluating a position of one welding point along the welding line based on said plurality of pieces of positional information.

40. A method for sensing a welding point in an automatic welding apparatus in accordance with claim 36, wherein the workpiece has a beveling which is butt welded, and having a beveling intersection line, and which further comprises the steps of:
(a) detecting a first position on the surface of the workpiece in the vicinity of the beveling for providing a first piece of data representative of the first position,
(b) detecting a second position on the surface of the workpiece closer to the beveling than the first position and spaced apart a predetermined distance from the first position on the surface of the workpiece for providing a second piece of data representative of the second position,
(c) evaluating the difference in represented position between the first piece of data and the second piece of data,
(d) comparing the evaluated difference with a predetermined value for providing an error value and determining whether said error value is smaller or larger than a predetermined value,
(e) repeating step (b) by replacing the first piece of data and the second piece of data, when said error value is smaller or larger than a predetermined value, (f) determining whether the angle of the beveling has been manually entered when the error value is larger than said predetermined value, (g) detecting a third position on the surface of the beveling at an end opposite from the position of the first and second positions for providing a third piece of data, when the angle of beveling has been manually entered, and (h) evaluating an intersection of the beveling line based on the second piece of data and the third piece of data.

41. A method for sensing a welding point in an automatic welding apparatus in accordance with claim 40, which further comprises the step of:

detecting two point positions for each beveling surface, including the second position, when the angle of beveling has not been manually entered as determined in said step (f), for evaluating the intersection of the beveling line based on these detected pieces of data.

42. A method for sensing a welding point in an automatic welding apparatus in accordance with caim 41, which further comprises the step of:

detecting a further position on the surface of the beveling, spaced apart a predetermined distance from the beveling when the angle of beveling has not been manually entered as determined in said step (f) for providing an additional piece of data and for evaluating the difference in value between the second piece of data and the first piece of data and further evaluating a still further position spaced apart from the beveling by a smaller predetermined distance than that of the further position as an intersection of the beveling line, when the sign of the evaluated difference value is opposite that of the previously evaluated difference value.

43. A method for sensing a welding point in an automatic welding apparatus in accordance with claim 36, wherein the automatic welding apparatus comprises electrode supply means for sequentially supplying a consumptive electrode to the welding torch in accordance with the progress of welding in the welding mode, and a reference position member positioned at a predetermined position from the automatic welding apparatus, and which further comprises the steps of:

changing the voltage supply means to the sensing mode, and bringing the tip end of the electrode of the welding torch adjacent to the reference position member, and evaluating information concerning the protruding length of the electrode responsive to the output of said electric current conducting state detecting means, the information obtainable when the tip end of the electrode of the welding torch is adjacent to the reference position member.

44. A method for sensing a welding point in an automatic welding apparatus in accordance with claim 36, wherein the automatic welding apparatus further comprises electrode supply means for sequentially supplying a consumptive electrode to the welding torch in accordance with the progress of welding in the welding mode, and a reference position member positioned at a predetermined position from the automatic welding apparatus, and which further comprises the steps of:

changing the voltage supply means to the sensing mode, feeding the consumptive electrode from the consumptive electrode supply means, and disabling the consumptive electrode supply means responsive to the output from the electric current conduction state detecting means obtainable when the tip end of said consumptive electrode is adjacent to the reference position member.

45. A method for sensing a welding point in an automatic welding apparatus in accordance with claim 36 wherein the electrode of the welding torch comprises a consumptive electrode and the welding torch is laterally displaceable, and which further comprises in the welding mode the steps of:

detecting at least one of the welding voltage applied to the consumptive electrode or the welding current flowing through the consumptive electrode, comparing the at least one of the detected welding voltage and welding current with a predetermined value, and controlling the lateral position of the welding torch in response to the value obtained in comparing step.

46. A method for sensing a welding point in an automatic welding apparatus in accordance with claim 45, wherein the comparison step comprises evaluating the difference in value between the at least one of the detected welding voltage and the welding current and a predetermined value.

47. A method for sensing a welding point in an automatic welding apparatus in accordance with claim 46, wherein the lateral positional control step of the welding torch comprises controlling the position of said welding torch in response to the difference value in the direction which causes said difference value to approach zero.

48. An apparatus for sensing a welding point in an automatic welding apparatus for performing welding operations between an electrode included in a welding torch and a workpiece having a welding line and fixed to a workpiece fixture, said welding operation being performed based on a welding point evaluated in response to the output of said sensing apparatus, said sensing apparatus comprising:

voltage supply means coupled to said electrode of said welding torch for supplying a voltage to said electrode of said welding torch, said voltage supply means having a sensing mode and a welding mode, mode selecting means operatively coupled to said voltage supply means for selectively changing the mode of said voltage supply means to a selected one of said sensing mode and said welding mode, detecting means operatively coupled to said electrode of said welding torch for detecting the occurrence of electrical conduction between said electrode and said workpiece in said sensing mode, positional information generating means operatively coupled to at least one of said welding torch and said workpiece fixture for generating positional information representative of the position of at least one of said welding torch and said workpiece fixture based on the output of said detecting means in said sensing mode, and control means for controlling the positions of said welding torch and said workpiece fixture in said sensing mode for bringing said electrode into proximity with respect to said welding line, said control means being responsive to said positional information from said positional information generating means for evaluating information concerning said welding point.

49. A sensing apparatus in accordance with claim 48, wherein said welding apparatus comprises storage means for storing command positional information concerning a desired relative positional relationship between said welding torch and said workpiece fixture, and wherein said control means corrects said command positional information based on evaluated information concerning at least one of said welding point and welding line.

50. A sensing apparatus in accordance with claim 48, wherein said control means further evaluates information concerning said welding line based on said evaluated information corresponding to said welding point.

51. A sensing apparatus in accordance with claim 48, wherein said control means brings said electrode of said welding torch and said workpiece into proximity with respect to each other at a plurality of point positions crossing said welding line, whereby a plurality of pieces of positional information concerning said plurality of point positions is generated by said positional information generating means, and wherein said control means evaluates one welding point position along said welding line in correspondence with said plurality of pieces of positional information.

52. A sensing apparatus in accordance with claim 48, wherein said workpiece has a beveling including a beveling line which is butt welded, and said control means comprises;
  first means for detecting a first position on the surface of said workpiece in the vicinity of said beveling for providing a first piece of data representing said first position,
  second means for detecting a second position on the surface of said workpiece closer to said beveling than said first position and spaced apart by a predetermined distance from said first position on the surface of said workpiece for providing a second piece of data representative of said second position,
  third means for evaluating a difference between said first piece of data and said second piece of data,
  fourth means for comparing said difference with a predetermined value for providing an error value and determining whether said error value is smaller or larger than a predetermined value,
  said second means detecting a further position on the surface of said workpiece by substituting values of said first piece of data and said second piece of data, when said error value is smaller or larger than said predetermined value,
  means for manually programming the angle of said beveling,
  fifth means for determining whether the angle of said beveling has been manually programmed, when said error is larger than said predetermined value,
  sixth means for detecting a third position on the surface of said beveling at the side opposite the second position for providing a third piece of data, when the angle of beveling has been manually programmed, and
  seventh means for evaluating an intersection of the beveling line in correspondence with said second piece of data and said third piece of data.

53. A sensing apparatus in accordance with caim 52, wherein said control means detects two point positions for each beveling surface, including said second position, if the angle of beveling has not been manually programmed, as determined by said fifth means, for evaluating said intersection of said beveling line in correspondence with these pieces of data.

54. A sensing apparatus in accordance with claim 53, wherein said control means is adapted to detect a further position on the surface spaced apart the same predetermined distance, if and when the angle of beveling is not known in advance, as determined by said fifth means, for providing a further piece of data and for evaluating the difference between said second piece of data and said first piece of data, and further evaluting a slightly returned position as an intersection of the beveling line, if and when the sign of the difference value changes.

55. A sensing apparatus in accordance with claim 48, wherein said voltage supply means comprises a detecting voltage supply and a welding voltage supply, and said mode selecting means comprises a switch means for selectively connecting said electrode of said welding torch to said detecting voltage supply or said welding voltage supply.

56. A sensing apparatus in accordance with claim 55, wherein said detecting voltage supply means comprises a high frequency oscillating voltage supply, and said switch means comprises switching means for selectively applying the output of said high frequency oscillating voltage supply in superposition with the output from said welding voltage supply to said electrode of said welding torch in said sensing mode, and for selectively applying only the output of said welding voltage supply to said electrode of said welding torch in said welding mode.

57. A sensing apparatus in accordance with claim 55, wherein said detecting voltage supply means comprises an electric current limiting circuit provided between said welding voltage supply and said electrode of said welding torch, and said switch means comprises means for selectively actuating said electric current limiting circuit in said sensing mode and deactuating said current limiting circuit in said welding mode.

58. A sensing apparatus in accordance with claim 57, wherein said electric current limiting circuit comprises a resistor.

59. A sensing apparatus in accordance with claim 48, which further comprises electrode supply means for sequentially supplying a consumptive electrode to said welding torch in accordance with the progress of welding in said welding mode.

60. A sensing apparatus in accordance with claim 59, wherein said consumptive electrode is movable in the longitudinal direction of said welding torch by a predetermined length, and said welding torch comprises clamp means for clamping said consumptive electrode with respect to said welding torch when said consumptive electrode protrudes from the tip end of said welding torch by said predetermined length.

61. A sensing apparatus in accordance with claim 60, wherein said clamp means comprises a collet chuck and a fastening means for fastening said collet chuck.

62. A sensing apparatus in accordance with claim 61, wherein said fastening means comprises:
  a cylinder
  a piston slidably fitted in said cylinder for unidirectional movement, and
  moving means for moving said piston in accordance with unidirectional movement.

63. A sensing apparatus in accordance with claim 62, wherein said moving means comprises means for supplying a high pressure gas in said cylinder for imparting said unidirectional movement to said piston.

64. A sensing apparatus in accordance with claim 59, wherein said electrode supply means comprises shaping means for forcibly shaping said consumptive electrode into a predetermined configuration.

65. A sensing apparatus in accordance with claim 64, wherein said shaping means comprises a flexible tube shaped in a loop for shaping said consumptive electrode in a curl configuration.

66. A sensing apparatus in accordance with claim 64, wherein said shaping means comprises a pressing roller for straightening said consumptive electrode.

67. A sensing apparatus in accordance with claim 59, which further comprises a reference position member positioned at a predetermined position from said automatic welding apparatus, and wherein said control means further comprises:
   means for switching said voltage supply means to said sensing mode,
   means for bringing the tip end of said electrode of said welding torch adjacent to said reference position member, and
   means for evaluating information corresponding to the protruding length of said electrode in response to the output of said electric current conduction state detecting means provided when the tip end of said welding torch becomes adjacent to said reference position member.

68. A sensing apparatus in accordance with claim 67, wherein the optimum protruding length of said consumptive electrode in said sensing mode is selected to be a predetermined standard protruding length, and wherein information concerning the error of said protruding length of said electrode of said welding torch comprises information concerning the error with respect to said standard protruding length.

69. A sensing apparatus in accordance with claim 67, wherein said reference position member comprises said workpiece fixture.

70. A sensing apparatus in accordance with claim 67, wherein said reference position member comprises a predetermined position on the surface of said workpiece fixed on said workpiece fixture.

71. A sensing apparatus in accordance with claim 59, which further comprises a reference position member positioned at a predetermined position from said automatic welding apparatus, and wherein said control means comprises:
   means for switching said voltage supply means to said sensing mode,
   means for feeding said consumptive electrode from said consumptive electrode supply means, and
   means for disabling said consumptive electrode supply means in response to the output from said electric current conduction state detecting means provided when the tip end of said consumptive electrode becomes adjacent to said reference position member.

72. A sensing apparatus in accordance with claim 71, wherein said reference position member comprises said workpiece fixture.

73. A sensing apparatus in accordance with claim 71, wherein said reference position member comprises a predetermined position on the surface of said workpiece fixed on said workpiece fixture.

74. A sensing apparatus in accordance with claim 71, wherein said reference position member comprises a structure integrally provided on said welding torch and positioned at a predetermined position in front of said welding torch.

75. A sensing apparatus in accordance with claim 74, wherein said welding torch comprises a displaceable rod, said reference position member is provided at the tip end of said displaceable rod along said welding torch, and said means for positioning at said predetermined position comprises means for swinging said rod from a retracted state to a displaced state.

76. A sensing apparatus in accordance with claim 59, which further comprises:
   means provided opposite to and spaced apart a predetermined distance from said welding torch for cutting the consumptive electrode protruding from said welding torch, and
   trim means for controllably protruding said consumptive electrode by means of said consumptive electrode supply means and for enabling said cutting means.

77. A sensing apparatus in accordance with claim 76, wherein said cutting means comprises a rotary grinding stone.

78. A sensing apparatus in accordance with claim 76, wherein said cutting means comprises means for shearing said consumptive electrode.

79. A sensing apparatus in accordance with claim 48, wherein said control means comprises:
   means responsive to the welding mode for detecting at least one of the welding voltage applied to said consumptive electrode and the welding current flowing through said consumptive electrode,
   comparing means responsive to the welding mode for comparing said at least one of the detected welding voltage and welding current with a predetermined value, and
   controlling means for controlling the position, in the longitudinal direction, of said welding torch in response to the output of said comparing means.

80. A sensing apparatus in accordance with claim 79, wherein said comparing means comprises:
   means for evaluating a difference between said at least one of the detected welding voltage and the welding current, and said predetermined value.

81. A sensing apparatus in accordance with claim 80, wherein said controlling means controls the position of said welding torch in the direction which causes said difference to equal zero in response to said difference.

* * * * *